US012404993B2

(12) United States Patent
Wiegel et al.

(10) Patent No.: US 12,404,993 B2
(45) Date of Patent: Sep. 2, 2025

(54) FAN AND LIGHT UNITS AND ASSOCIATED MOUNTING ARRANGEMENTS FOR USE AT A LOADING DOCK

(71) Applicant: Rite-Hite Holding Corporation, Milwaukee, WI (US)

(72) Inventors: Aaron J. Wiegel, Benton, WI (US); David Swift, Dubuque, IA (US); Jason Dondlinger, Bellevue, IA (US); Lucas I. Paruch, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 18/349,702

(22) Filed: Jul. 10, 2023

(65) Prior Publication Data

US 2023/0392774 A1 Dec. 7, 2023

Related U.S. Application Data

(63) Continuation of application No. 17/567,615, filed on Jan. 3, 2022, now Pat. No. 11,739,924, which is a (Continued)

(51) Int. Cl.

*F21V 21/28* (2006.01)
*F04D 27/00* (2006.01)

(Continued)

(52) U.S. Cl.

CPC .............. *F21V 21/28* (2013.01); *F04D 27/00* (2013.01); *F21V 21/34* (2013.01); *F21V 21/40* (2013.01);

(Continued)

(58) Field of Classification Search

CPC ...... F21V 33/0096; F21V 21/28; F21V 21/34; F21V 21/40; F21V 23/002; F21S 8/036;

(Continued)

(56) References Cited

U.S. PATENT DOCUMENTS

| | | | |
|---|---|---|---|
| 1,125,346 | A | 1/1915 | Kramer |
| 2,538,655 | A | 1/1951 | Preston |

(Continued)

FOREIGN PATENT DOCUMENTS

| | | | |
|---|---|---|---|
| CA | 2589238 | A1 | 6/2006 |
| CA | 2772932 | A1 | 3/2011 |

(Continued)

OTHER PUBLICATIONS

Rite-Hite, "CoolMan 2500 Trailer Fan Owner's and Installation Manual," Mar. 2004, 12 pages.

(Continued)

*Primary Examiner* — Zheng Song
(74) *Attorney, Agent, or Firm* — Hanley, Flight & Zimmerman, LLC

(57) ABSTRACT

Example fan and light units and associated mounting arrangements for use at a loading dock are disclosed. An example apparatus includes a frame including a bar to be pivotally coupled to a support system via a point of attachment on the bar. The apparatus includes a fan and a controller to be coupled to the frame with the bar extending in a first direction away from the controller and toward the point of attachment, the controller to control operation of the fan. The apparatus includes a handle to be connected to a portion of the frame extending away from the controller in a second direction opposite the first direction, the handle spaced apart from a housing of the fan, the handle to be lower than the controller and lower than at least a midpoint of the fan when the apparatus is supported by the support system.

20 Claims, 22 Drawing Sheets

Related U.S. Application Data continuation of application No. 16/747,360, filed on Jan. 20, 2020, now Pat. No. 11,215,346, which is a continuation-in-part of application No. 29/703,602, filed on Aug. 28, 2019, now Pat. No. Des. 933,283.

(60) Provisional application No. 62/816,050, filed on Mar. 8, 2019.

(51) Int. Cl.
*F21V 21/34* (2006.01)
*F21V 21/40* (2006.01)
*F21V 23/00* (2015.01)
*F21V 33/00* (2006.01)
*F04D 29/42* (2006.01)

(52) U.S. Cl.
CPC ........ *F21V 23/002* (2013.01); *F21V 33/0096* (2013.01); *F04D 29/4226* (2013.01)

(58) Field of Classification Search
CPC .. F04D 29/4226; F04D 29/005; F04D 29/601; F04D 27/00
See application file for complete search history.

(56) References Cited

U.S. PATENT DOCUMENTS 3,275,878 A 9/1966 Wilbanks
3,475,844 A 11/1969 Uda et al.
3,782,443 A 1/1974 Clauss
4,424,006 A * 1/1984 Armbruster ........... F04D 25/084 417/313
4,651,966 A 3/1987 Suzuki
4,696,450 A 9/1987 Huang
4,697,430 A 10/1987 Toyoda et al.
D296,369 S 6/1988 Harvey
4,856,968 A 8/1989 Armbruster
4,973,012 A 11/1990 Hashizume
4,973,016 A * 11/1990 Hertenstein ........... F21V 21/108 248/282.1
5,062,029 A 10/1991 Engel
D327,131 S 6/1992 Vrancart et al.
5,148,849 A 9/1992 Faludy
5,171,086 A 12/1992 Baloochi
D340,405 S 10/1993 Anderson
5,287,253 A 2/1994 Blorstad
D359,225 S 6/1995 Reed
5,575,097 A 11/1996 Chou et al.
5,603,562 A 2/1997 Huang
D378,863 S 4/1997 Wang
5,667,188 A 9/1997 Bettinsoli
5,709,458 A 1/1998 Metz
5,738,056 A 4/1998 Mikame
D397,468 S 8/1998 Zeller
5,791,763 A 8/1998 Kam-Hoi
5,996,898 A 12/1999 Parker et al.
6,183,203 B1 * 2/2001 Grintz ................ F16M 11/2014 416/246
D444,260 S 6/2001 Dolan
6,244,821 B1 6/2001 Boyd et al.
D454,975 S 3/2002 De'Armond
6,589,016 B2 7/2003 Boyd et al.
6,692,229 B2 2/2004 Metz
6,767,117 B2 7/2004 De' Armond
6,812,849 B1 11/2004 Ancel
6,817,835 B2 11/2004 Boyd et al.
6,859,644 B2 2/2005 Wang
6,890,149 B2 5/2005 Metz et al.
7,101,064 B2 9/2006 Ancel
7,147,336 B1 12/2006 Chou
D537,196 S 2/2007 Summerford
D542,943 S 5/2007 Wang
D546,980 S 7/2007 Lo
D549,854 S 8/2007 Takahashi
7,257,706 B1 8/2007 Zucker
D566,300 S 4/2008 Lo
D582,578 S 12/2008 Tsai et al.
D593,223 S 5/2009 Komar
D599,931 S 9/2009 Van Klinken
D608,047 S 1/2010 Scheper
7,762,688 B2 7/2010 Dixon et al.
7,823,239 B2 11/2010 Hochstein et al.
D636,928 S 4/2011 Lin
D647,646 S 10/2011 Tsung
8,069,520 B2 12/2011 Mattucci
D664,272 S 7/2012 Lee
8,366,301 B2 2/2013 Hudson et al.
8,408,761 B2 4/2013 Ng
D683,883 S 6/2013 Yorio et al.
8,528,719 B2 9/2013 Huttner
D693,947 S 11/2013 Wiegel et al.
8,590,689 B2 11/2013 Wahl
D701,640 S 3/2014 Wiegel et al.
D702,397 S 4/2014 Wiegel et al.
9,255,699 B2 2/2016 Wiegel et al.
D762,917 S 8/2016 Nankil
D797,989 S 9/2017 Herft
D804,704 S 12/2017 Xia et al.
D818,517 S 5/2018 Szarawarski
10,145,503 B2 12/2018 Feldman et al.
D844,882 S 4/2019 Schuyler
D851,805 S 6/2019 Chen
D853,630 S 7/2019 Wilcox
D882,862 S 4/2020 Antoni
D899,674 S 10/2020 He
D905,225 S 12/2020 Hidalgo
D907,842 S 1/2021 Mackin
D933,283 S 10/2021 Wiegel
11,215,346 B2 1/2022 Wiegel
11,739,924 B2 8/2023 Wiegel et al.
D1,018,958 S 3/2024 Wiegel et al.
2002/0037098 A1 3/2002 Beaty et al.
2002/0045420 A1 4/2002 Taillon
2002/0144782 A1 10/2002 Okuno et al.
2003/0067767 A1 4/2003 Liu
2003/0133977 A1 7/2003 Mahashabde
2003/0151912 A1 8/2003 Ancel
2004/0114921 A1 6/2004 Braun et al.
2004/0131470 A1 7/2004 Boyd
2004/0160199 A1 8/2004 Morgan
2004/0254725 A1 12/2004 Douville
2005/0168999 A1 8/2005 Sommers et al.
2005/0230592 A1 10/2005 Tillinghast et al.
2005/0260943 A1 * 11/2005 Snyder ............... B60H 1/00014 454/118
2005/0269043 A1 12/2005 Welsh
2006/0048631 A1 3/2006 Jakes et al.
2006/0049615 A1 3/2006 Day
2006/0133097 A1 6/2006 Doric et al.
2006/0133907 A1 6/2006 Bullock
2006/0213672 A1 9/2006 Mohr
2007/0003421 A1 1/2007 Kato
2007/0057807 A1 3/2007 Walters
2007/0214586 A1 9/2007 Mattucci et al.
2007/0273290 A1 11/2007 Ashdown
2008/0010757 A1 1/2008 Hochstein et al.
2009/0116961 A1 5/2009 Todd, Jr.
2009/0147120 A1 6/2009 Kurane
2009/0287352 A1 11/2009 Geist
2010/0052549 A1 3/2010 Hudson et al.
2010/0075588 A1 3/2010 Haneline
2010/0146719 A1 6/2010 Swessel et al.
2010/0201267 A1 8/2010 Bourquin et al.
2010/0240418 A1 9/2010 Matoba
2010/0291858 A1 11/2010 Toy
2010/0301773 A1 12/2010 Chemel et al.
2011/0001957 A1 1/2011 Braune et al.
2011/0051437 A1 3/2011 Ng
2011/0203059 A1 8/2011 Whitley et al.
2011/0304840 A1 12/2011 Hsu et al.
2012/0012424 A1 1/2012 Bowman
2012/0055757 A1 3/2012 Wahl
2012/0055758 A1 3/2012 Huttner

(56) References Cited

U.S. PATENT DOCUMENTS

| | | | |
|---|---|---|---|
| 2013/0173064 A1 | 7/2013 | Fadell | |
| 2014/0112791 A1* | 4/2014 | Abell | F04D 25/084 416/159 |
| 2014/0225509 A1 | 8/2014 | Wiegel | |
| 2015/0176834 A1 | 6/2015 | Avedon | |
| 2016/0169498 A1 | 6/2016 | Lei et al. | |
| 2017/0074503 A1 | 3/2017 | Horng et al. | |
| 2017/0144645 A1 | 5/2017 | Metz et al. | |
| 2017/0168531 A1 | 6/2017 | Casparian et al. | |
| 2017/0343222 A1 | 11/2017 | Markert et al. | |
| 2018/0335040 A1* | 11/2018 | Rouse | F04D 25/084 |
| 2019/0144218 A1 | 5/2019 | Hoofard et al. | |
| 2019/0264698 A1 | 8/2019 | Parel | |
| 2020/0085162 A1 | 3/2020 | Yoo et al. | |
| 2020/0284411 A1 | 9/2020 | Wiegel et al. | |
| 2022/0178528 A1 | 6/2022 | Wiegel et al. | |

FOREIGN PATENT DOCUMENTS

| | | | |
|---|---|---|---|
| CN | 1084834 | A | 4/1994 |
| CN | 1175661 | A | 3/1998 |
| CN | 1382564 | A | 12/2002 |
| CN | 101384205 | A | 3/2009 |
| CN | 201313754 | Y | 9/2009 |
| CN | 102026781 | A | 4/2011 |
| CN | 102398762 | A | 4/2012 |
| CN | 102625890 | A | 8/2012 |
| DE | 4031471 | A1 | 4/1992 |
| DE | 69703670 | T2 | 5/2001 |
| EP | 0799977 | B1 | 12/2000 |
| EP | 1465563 | A1 | 10/2004 |
| EP | 1983879 | A2 | 10/2008 |
| EP | 2019252 | A1 | 1/2009 |
| EP | 1769187 | B1 | 10/2009 |
| EP | 2359731 | A2 | 8/2011 |
| EP | 2428470 | A1 | 3/2012 |
| EP | 2473779 | A1 | 7/2012 |
| EP | 2428471 | B1 | 6/2013 |
| FR | 437647 | A | 4/1912 |
| FR | 869468 | A | 2/1942 |
| GB | 983013 | A | 2/1965 |
| GB | 2010229 | A | 6/1979 |
| GB | 2123132 | A | 1/1984 |
| GR | 1003642 | B | 8/2001 |
| JP | 2000042970 | A | 2/2000 |
| JP | 3211713 | B2 | 9/2001 |
| JP | 2011026887 | A | 2/2011 |
| JP | 2011149300 | A | 8/2011 |
| JP | 2013504164 | A | 2/2013 |
| MX | 2012002624 | A | 7/2012 |
| WO | 2009003279 | A1 | 1/2009 |
| WO | 2009087261 | A1 | 7/2009 |
| WO | 2014123733 | A1 | 8/2014 |
| WO | 2015142871 | A1 | 9/2015 |

OTHER PUBLICATIONS

Mexican Institute of Industrial Property, "Office Action," issued in connection with Mexican Design Patent Application No. MX/f/2019/002484, dated Sep. 3, 2020, 7 pages.

IP Australia, "Examination Report No. 1," issued in connection with Australian Patent Application No. 2020200426, dated Oct. 1, 2020, 8 pages.

United States Patent and Trademark Office, "Office Non-Final Action" issued in connection with U.S. Appl. No. 16/747,360, mailed on Oct. 21, 2020, 23 pages.

Mexican Institute of Industrial Property, "Office Action," issued in connection with Mexican Design Patent Application No. MX/a/2020/000844, dated Nov. 9, 2020, 5 pages.

Canadian Intellectual Property Office, "Examination Report," issued in connection with Canadian Design Patent Application No. 189648, dated Nov. 20, 2020, 2 pages.

Canadian Intellectual Property Office, "Office Action," issued in connection with Canadian Patent Application No. 3069222, dated Mar. 1, 2021, 5 pages.

Mexican Institute of Industrial Property, "Notice of Allowance," issued in connection with Mexican Design Patent Application No. MX/f/2019/002484, dated Apr. 26, 2021, 4 pages.

United States Patent and Trademark Office, "Notice of Allowance and Fee(s) Due," issued in connection with U.S. Appl. No. 29/703,602, mailed on May 12, 2021, 7 pages.

United States Patent and Trademark Office, "Final Office Action" issued in connection with U.S. Appl. No. 16/747,360, mailed on May 24, 2021, 20 pages.

IP Australia, "Examination Report No. 2," issued in connection with Australian Patent Application No. 2020200426, dated Jul. 15, 2021, 3 pages.

Mexican Institute of Industrial Property, "Notice of Allowance," issued in connection with Mexican Design Patent Application No. MX/f/2020/003192, dated Aug. 4, 2021, 5 pages.

United States Patent and Trademark Office, "Advisory Action," issued in connection with U.S. Appl. No. 16/747,360, mailed on Aug. 6, 2021, 4 pages.

United States Patent and Trademark Office, "Notice of Allowance and Fee(s) Due," issued in connection with U.S. Appl. No. 16/747,360, mailed on Sep. 7, 2021, 19 pages.

IP Australia, "Notice of Acceptance for Patent Application," issued in connection with Australian Application No. 2020200426, dated Sep. 13, 2021, 3 pages.

United States Patent and Trademark Office, "Notice of Allowability for a Design Application," issued in connection with U.S. Appl. No. 29/703,602, dated Sep. 15, 2021, 2 pages.

Canadian Intellectual Property Office, "Office Action," issued in connection with Canadian Patent Application No. 3,069,222, dated Oct. 6, 2021, 4 pages.

Canadian Intellectual Property Office, "Office Action," issued in connection with Canadian Patent Application No. 201546, dated Oct. 19, 2021, 1 page.

Canadian Intellectual Property Office, "Examination Report," issued in connection with Canadian Patent Application No. 201548, dated Oct. 19, 2021, 1 page.

Canadian Intellectual Property Office, "Examination Report," issued in connection with Canadian Patent Application No. 201545, dated Oct. 19, 2021, 1 page.

Canadian Intellectual Property Office, "Examination Report," issued in connection with Canadian Patent Application No. 201547, dated Oct. 19, 2021, 1 page.

Canadian Intellectual Property Office, "Office Action," issued in connection with Canadian Patent Application No. 201549, dated Oct. 19, 2021, 1 page.

United States Patent and Trademark Office, "Supplemental Notice of Allowability," issued in connection with U.S. Appl. No. 16/747,360, mailed on Nov. 8, 2021, 3 pages.

Canadian Intellectual Property Office, "Notice of Registration," issued in connection with Canadian Patent Application No. 201546, dated Jan. 28, 2022, 8 pages.

Canadian Intellectual Property Office, "Notice of Registration," issued in connection with Canadian Patent Application No. 201545, dated Jan. 28, 2022, 8 pages.

Canadian Intellectual Property Office, "Notice of Registration," issued in connection with Canadian Patent Application No. 201547, dated Jan. 28, 2022, 8 pages.

Canadian Intellectual Property Office, "Notice of Registration," issued in connection with Canadian Patent Application No. 201548, dated Jan. 28, 2022, 8 pages.

Canadian Intellectual Property Office, "Notice of Registration," issued in connection with Canadian Patent Application No. 201549, dated Jan. 28, 2022, 8 pages.

Canadian Intellectual Property Office, "Office Action, "issued in connection with Canadian Patent Application No. 3,069,222 mailed on May 5, 2022, 3 pages.

United States Patent and Trademark Office, "Non-Final Office Action", issued in connection with U.S. Appl. No. 17/567,615, Jul. 15, 2022, 11 pages.

(56) References Cited

OTHER PUBLICATIONS

Australian Government, IP Australia, "Examination Report No. 1," issued in connection with Australian Patent Application No. 2021290321, dated Dec. 12, 2022, 5 pages.
United States Patent and Trademark Office, "Final Office Action", issued in connection with U.S. Appl. No. 17/567,615, Jan. 17, 2023, 14 pages.
Canadian Intellectual Property Office, "Office Action," issued in connection with Canadian Patent Application No. 3,069,222, mailed on Feb. 27, 2023, (5 pages).
United States Patent and Trademark Office, "Notice of Allowance and Fee(s) Due," issued in connection with U.S. Appl. No. 17/567,615, mailed on Mar. 29, 2023, 9 pages.
Mexican Intellectual Property Office, "Office Action," issued in connection with Mexican Design Patent Application No. MX/a/2020/000844, dated Mar. 30, 2023, 6 pages.
IP Australia, "Notice of Acceptance for Patent Application," issued in connection with Australian Patent Application No. 2021290321, dated Apr. 5, 2023, 3 pages.
United States Patent and Trademark Office, "Non-Final Office Action," issued in connection with U.S. Appl. No. 29/805,971, mailed on Jun. 9, 2023, 7 pages.
United States Patent and Trademark Office, "Supplemental Notice of Allowability," issued in connection with U.S. Appl. No. 17/734,792, mailed on Jun. 14, 2023, 2 pages.
United States Patent and Trademark Office, "Notice of Allowability," issued in connection with U.S. Appl. No. 17/567,615, mailed on Jul. 5, 2023, 2 pages.
Australian Government, IP Australia, "Notice to Grant," mailed in connection with Australian Patent Application No. 2021290321, mailed on Aug. 3, 2023, 1 page.
Mexican Institute of Industrial Property, "Notice of Allowance," issued in connection with Mexican Patent Application No. MX/a/2020/000844, dated Sep. 6, 2023, 6 pages.
United States Patent and Trademark Office, "Notice of Allowance and Fee(s) Due," issued in connection with U.S. Appl. No. 29/805,971, issued on Oct. 27, 2023, 8 pages.
Canadian Patent Office, "Conditional Notice of Allowance," issued in connection with Canadian Patent Application No. 3,069,222, mailed on Mar. 27, 2024, 3 pages.
IP Australia, "Examination report No. 1," issued in connection with Australian Patent Application No. 2023206105, issued on Jun. 7, 2024, 7 pages.
Australian Government, IP Australia, "Examination report No. 2," issued in connection with AU Application No. 2023206105, issued on Nov. 25, 2024, 2 pages.
Australian Government, IP Australia, "Notice of acceptance for patent application," issued in connection with Australian Patent Application No. 2023206105, dated Jan. 8, 2025, 3 pages.

* cited by examiner

FAN AND LIGHT UNITS AND ASSOCIATED MOUNTING ARRANGEMENTS FOR USE AT A LOADING DOCK

RELATED APPLICATIONS

This patent arises from a continuation of U.S. patent application Ser. No. 17/567,615, which was filed on Jan. 3, 2022, which was a continuation of U.S. patent application Ser. No. 16/747,360 (now U.S. Pat. No. 11,215,346), which was filed on Jan. 20, 2020, which was a continuation-in-part of U.S. Design patent application No. 29/703,602 (now U.S. Design Pat. No. D933,283), which was filed on Aug. 28, 2019, and which claims priority to U.S. Provisional Patent Application No. 62/816,050, which was filed on Mar. 8, 2019. U.S. patent application Ser. No. 17/567,615, U.S. patent application Ser. No. 16/747,360, U.S. Provisional Patent Application No. 62/816,050, and U.S. Design patent application No. 29/703,602 are incorporated herein by reference in their entireties. Priority to U.S. patent application Ser. No. 17/567,615, U.S. patent application Ser. No. 16/747,360, U.S. Provisional Patent Application No. 62/816,050, and U.S. Design patent application No. 29/703,602 is claimed.

FIELD OF THE DISCLOSURE

This patent generally pertains to loading dock equipment and more specifically to fan and light units and associated mounting arrangements for use at a loading dock.

BACKGROUND

A typical loading dock of a building includes an elevated platform for transferring cargo to and from a vehicle, such as a truck or trailer. A passageway defined in the exterior building wall is generally positioned above and adjacent to the elevated platform, and may be selectively blocked by a door to separate the interior and exterior environments or unblocked to enable transfer of a load between the building and the vehicle therethrough. Loading docks include various pieces of equipment to facilitate the loading and unloading operations. Examples of such equipment include dock levelers, vehicle restraints, weather barriers, lights for illuminating the vehicle's cargo bay, and fans for ventilating the cargo bay.

DETAILED DESCRIPTION

Example mounted light and fan units disclosed herein for use vehicle loading docks include both a light and a fan. While cargo is being transferred to or from the cargo bay of a vehicle parked at the dock, the light illuminates the cargo bay while the fan ventilates it. In some examples, a fan axis of the fan's impeller can be changed selectively to horizontal and vertical orientations. Some examples of the mounted light and fan include an articulated arm mounted to a building wall by way of a bracket that is vertically adjustable. In some examples, a curved frame couples the articulated arm to the fan's housing, wherein the frame serves as a conduit for electrical wiring extending between the light and a controller. Some examples of the mounted light and fan include dual-grip handlebars for aiming the fan and the light.

Figure 1:
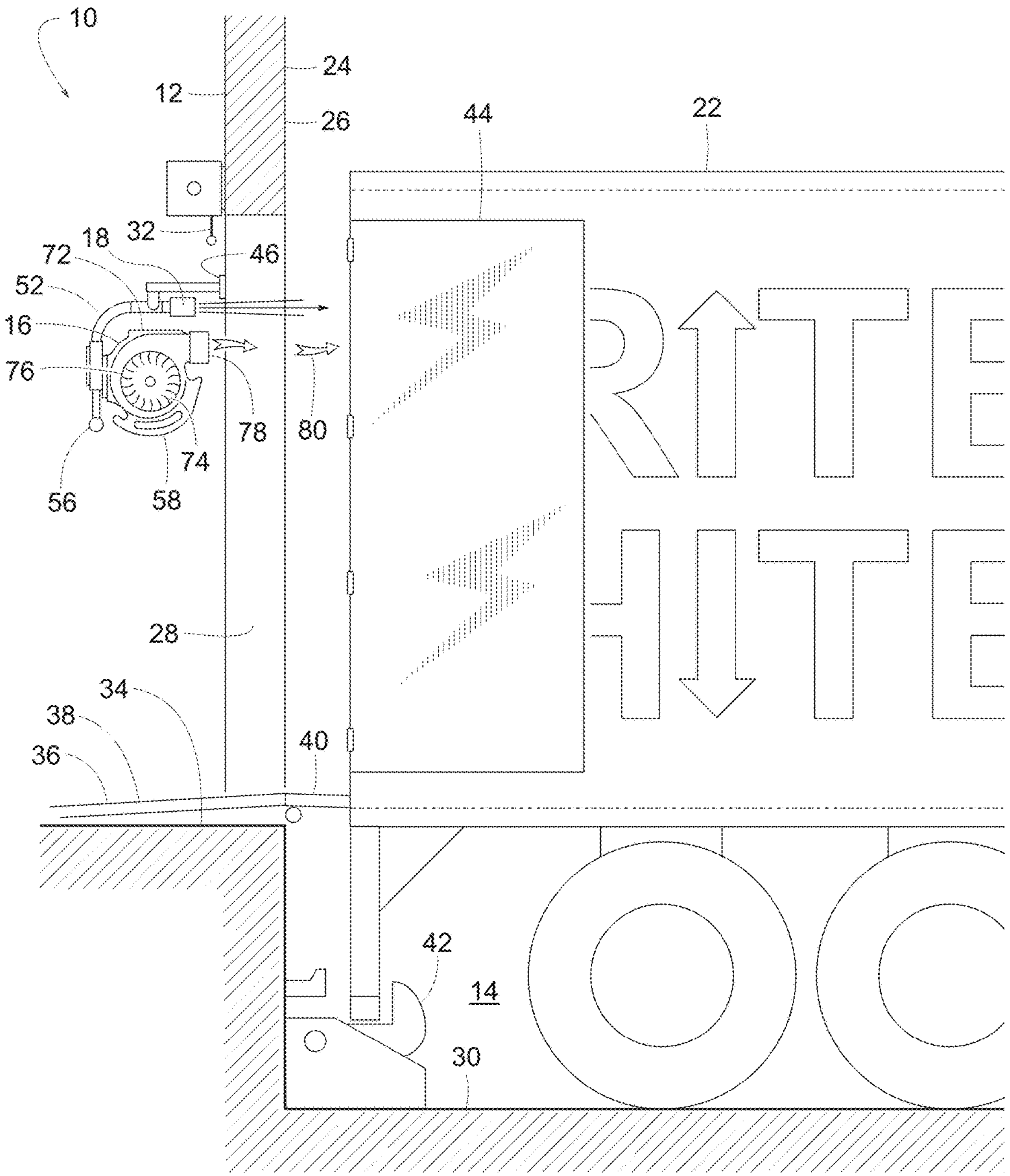
FIG. 1 is a side view of a vehicle at a loading dock with an example mounted fan and light apparatus constructed in accordance with teachings disclosed herein.
Figure 2:
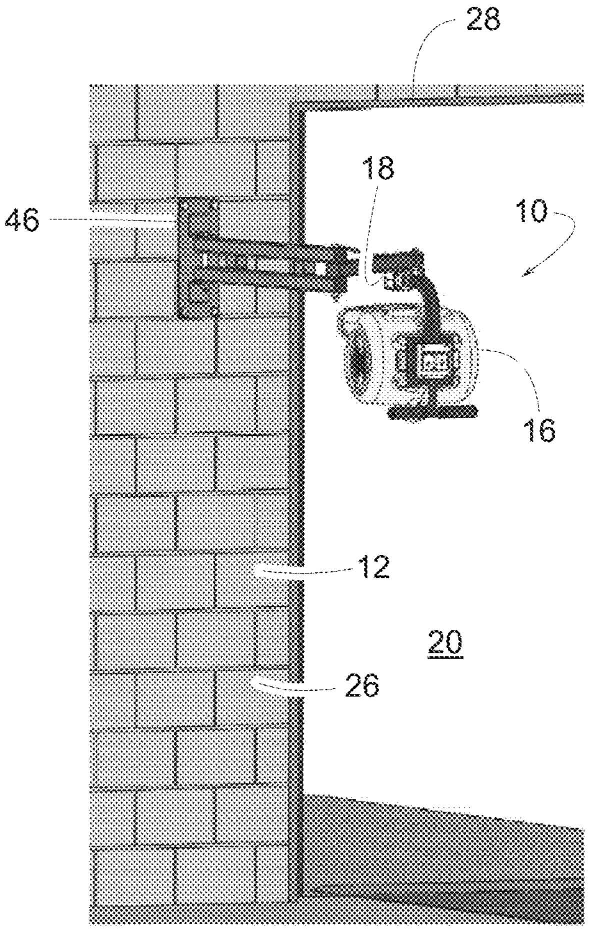
FIG. 2 is a perspective view of the example mounted fan and light apparatus shown in FIG. 1 from inside the building.
Figure 3:
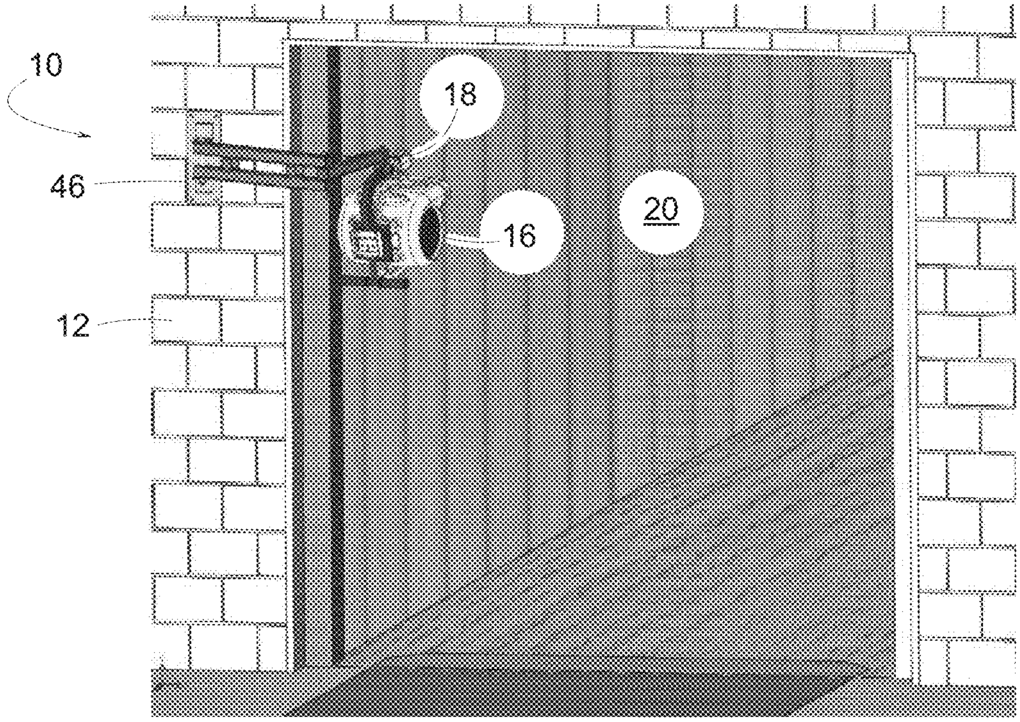
FIG. 3 is another perspective view of the example mounted fan and light apparatus shown in FIG. 1 from inside the building.
Figure 4:
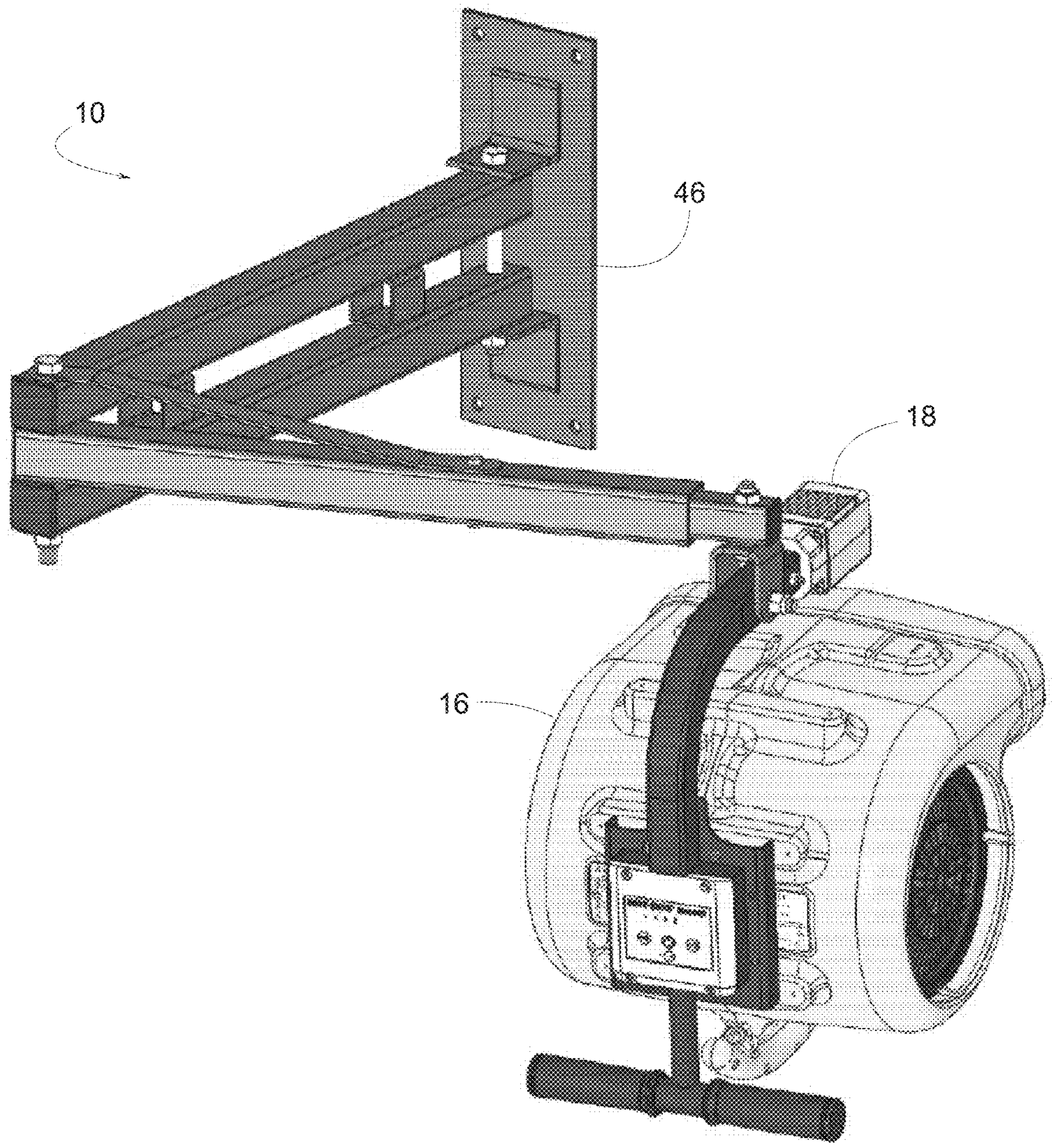
FIG. 4 is another perspective view of the example mounted fan and light apparatus shown in FIG. 1.

FIGS. 1-3 show an example mounted light and fan apparatus 10 secured to a building structure 12 (e.g., a wall, a doorframe, a bollard, a post, etc.) at a vehicle loading dock 14. The example apparatus 10 includes a fan 16 for ventilating an interior cargo bay 20 of a vehicle 22 (e.g., a truck, a trailer, etc.) parked at dock 14. Further, the example apparatus 10 includes a light 18 for illuminating the interior cargo bay 20 of the vehicle 22.

In the illustrated example, the dock 14 includes a building 24, a wall 26 with a doorway 28, a driveway or approach 30 leading to the doorway 28, a door 32, an elevated floor 34 of the building 24, a dock leveler 36 having an adjustable deck 38 and an extendible lip 40, and a vehicle restraint 42. Opening the door 32 of the dock 14 and a rear door 44 of the vehicle 22 enables cargo to be transferred between the building 24 and the vehicle's cargo bay 20. To aid loading and unloading operations, the dock leveler 36 provides a bridge between the dock floor 34 and the vehicle 22 across which the cargo can be transferred between the vehicle 22 and the building 24 while the vehicle restraint 42 helps secure the vehicle 22 at the dock 14. During the loading and/or unloading process(es), the mounted light and fan apparatus 10 helps illuminate and ventilate the vehicle's cargo bay 20 while reducing (e.g., minimizing) obstruction to movement through the doorway 28.

Details and alternatives of the mounted light and fan apparatus 10 are shown in FIGS. 4-20. Some examples of the apparatus 10 comprise a mounting bracket 46, a fan and light unit 48 (FIG. 11), and an articulated arm 50. The mounting bracket 46 is secured to a building structure 12. The fan and light unit 48 comprises a fan 16, a light 18, and a frame 52 coupled to both the fan 16 and the light 18. The fan and light unit 48 is also referred to herein as an illuminating fan assembly. The articulated arm 50 connects the fan and light unit 48 to the mounting bracket 46 to provide an adjustable support means for selectively positioning and aiming the fan and light unit 48. In some examples, the fan 16 and the light 18 are attached to the frame 52 to point in substantially the same direction (e.g., within 5 degrees of one another). In other examples, the light 18 may point in a direction that is offset relative to the direction in which the fan 16 is pointing. In some examples, the relatively direction of the fan 16 and the light 18 may be user-adjustable. In other examples, both the fan 16 and the light 18 are rigidly affixed to the frame so that the relative direction of the fan 16 and the light 18 is fixed. That is, in some examples, the fan 16 and the light 18 may be held in fixed relationship relative to one another.

Figure 11:
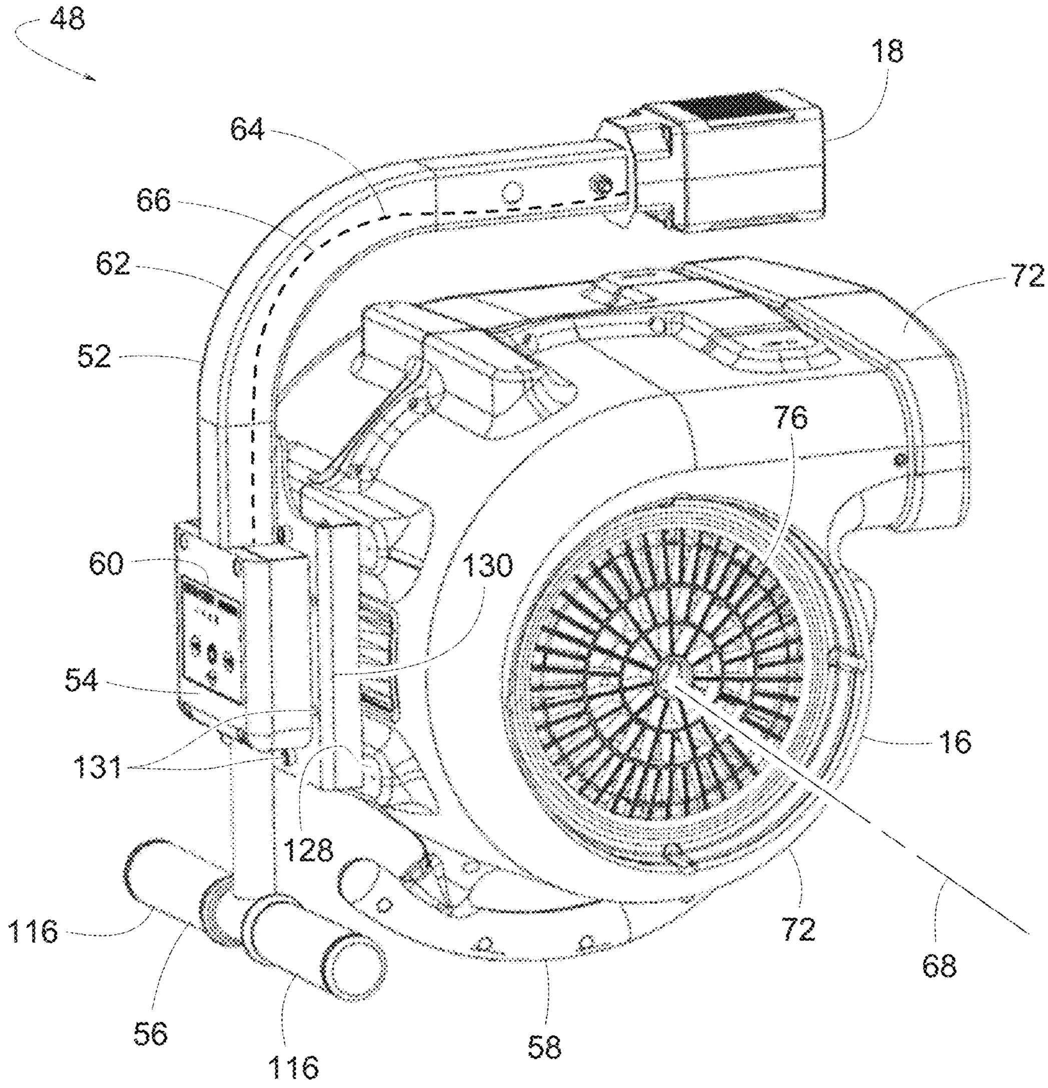
FIG. 11 is a perspective view of an example fan and light unit constructed in accordance with teachings disclosed herein.
Figure 12:
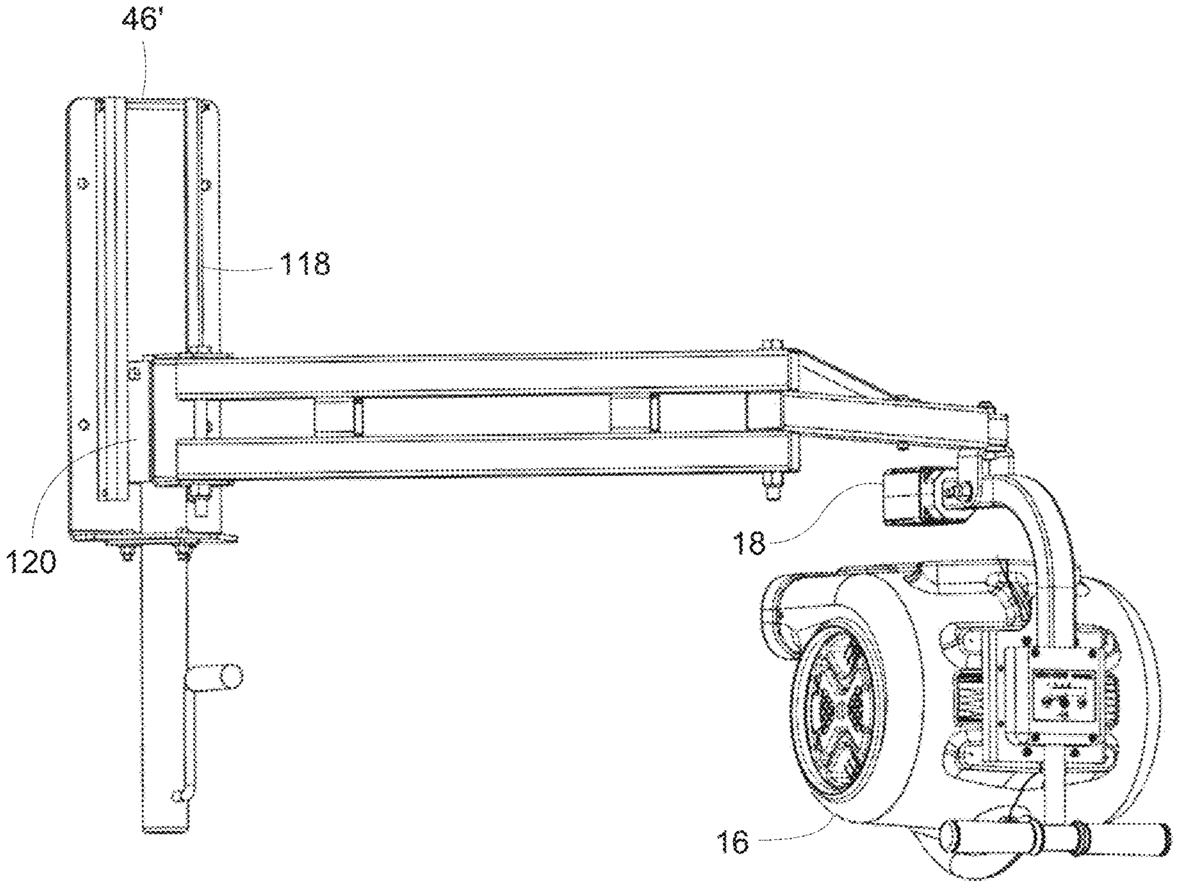
FIG. 12 is a perspective view of another example mounted fan and light apparatus constructed in accordance with teachings disclosed herein.
Figure 13:
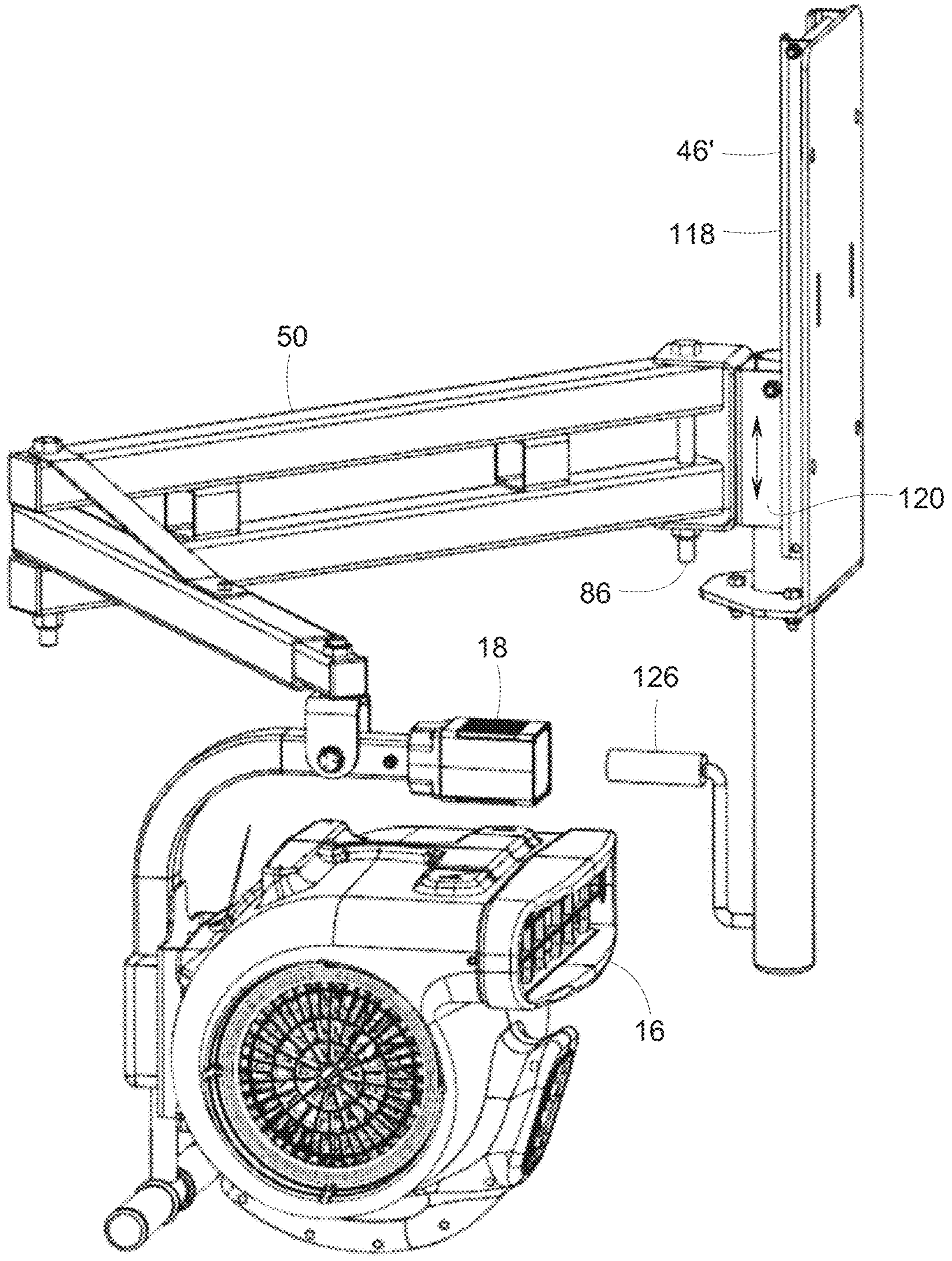
FIG. 13 is another perspective view of the example mounted fan and light apparatus shown in FIG. 12.
Figure 14:
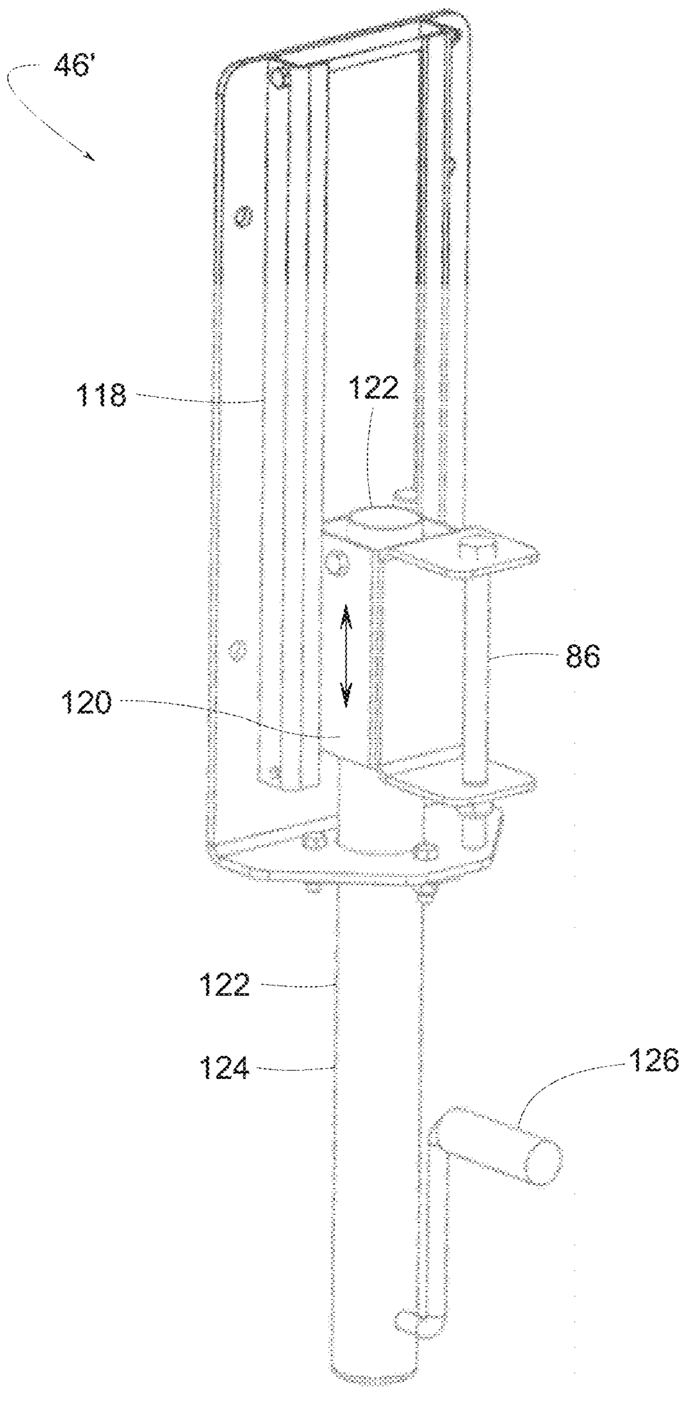
FIG. 14 is a perspective view of an example vertically adjustable mounting bracket constructed in accordance with teachings disclosed herein.
Figure 15:
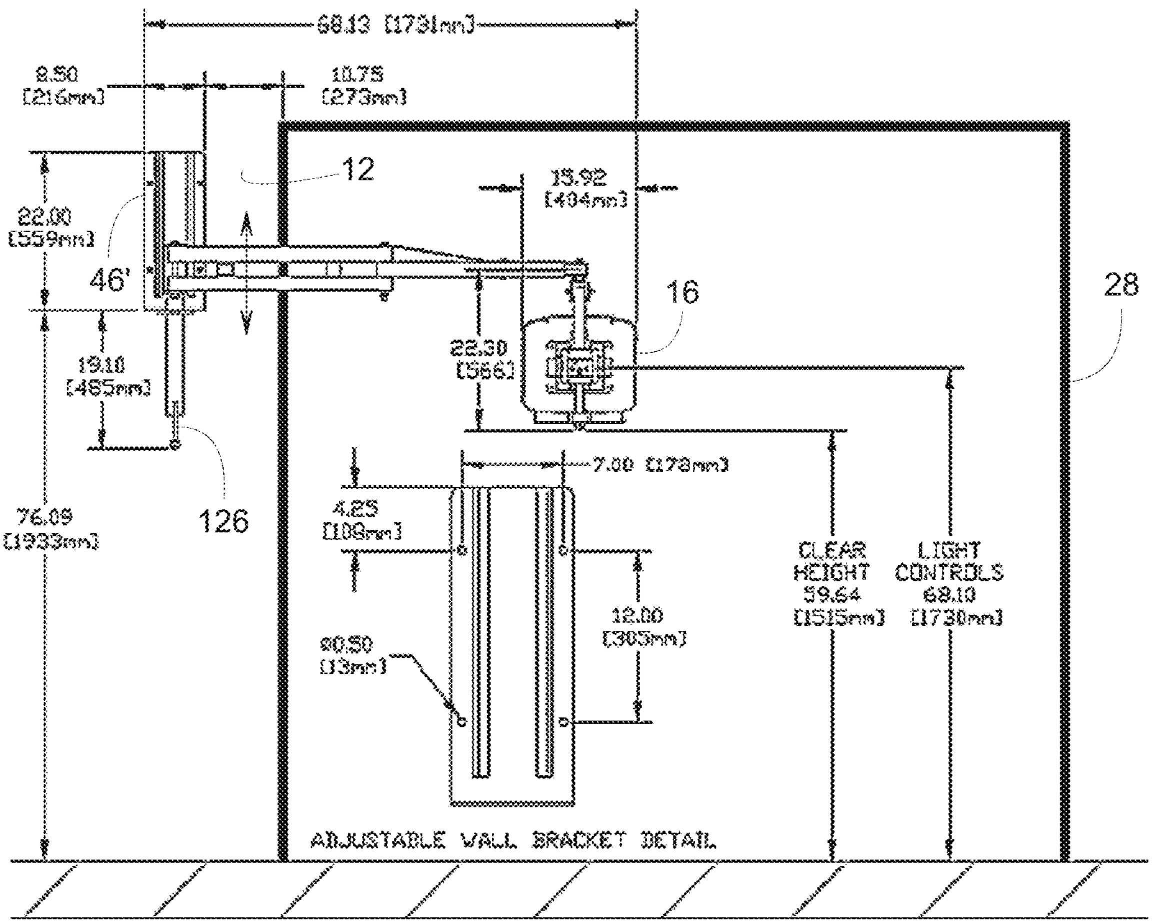
FIG. 15 is a diagram showing an example mounting arrangement of the example mounted fan and light apparatus at a loading dock in accordance with teachings disclosed herein.
Figure 16:
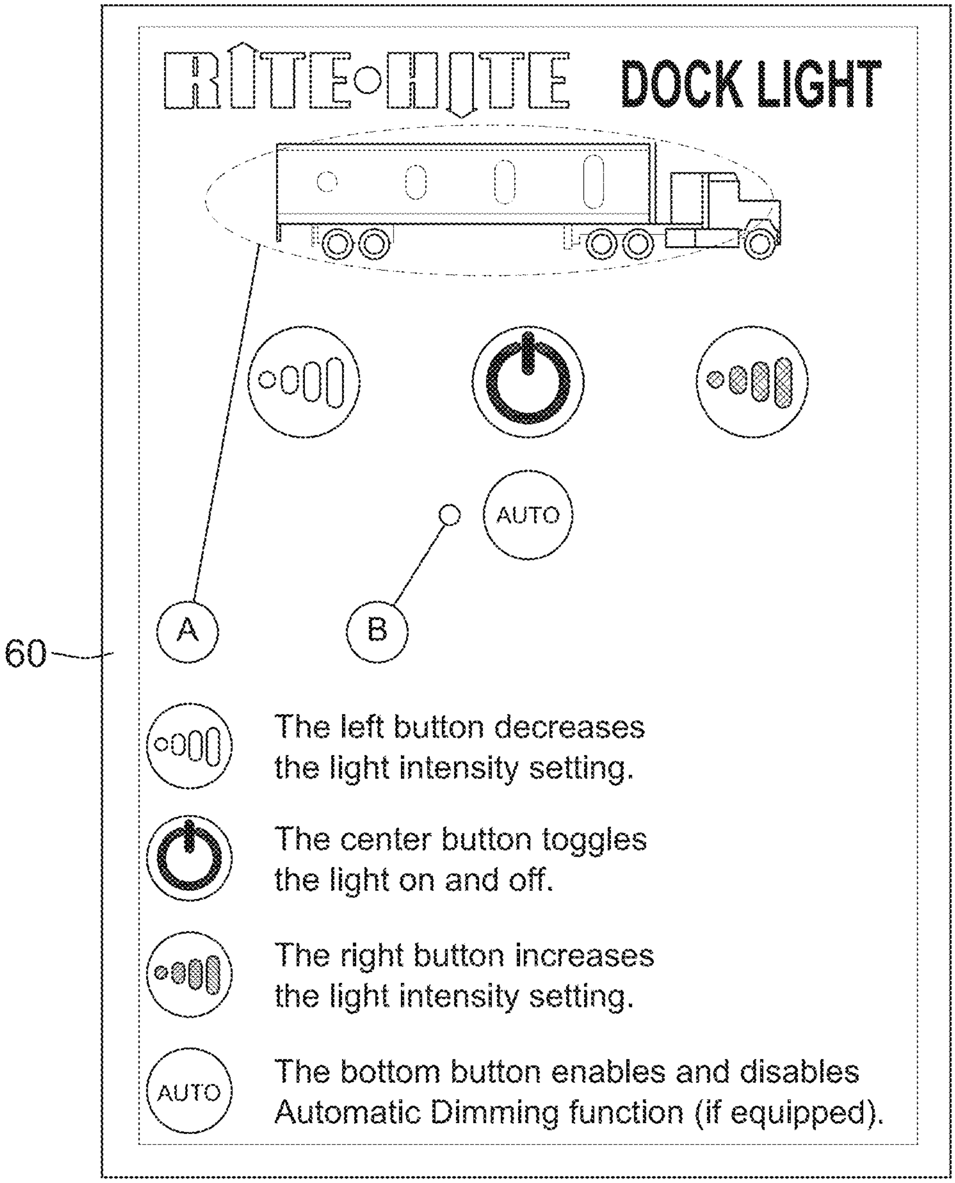
FIG. 16 is a diagram showing an example user interface on an example controller of an example fan and light unit constructed in accordance with teachings disclosed herein.

Referring to FIG. 11, some examples of the fan and light unit 48 comprise the fan 16, the light 18, the frame 52, and one or more controllers 54 for the light 18 and/or the fan 16, a first handle 56 and a second handle 58. In some examples, the first handle 56 comprises a portion of or extends from the frame 52. In some examples, the second handle 58 comprises a portion of or extends from the housing of the fan 16. FIG. 16 shows an example user interface 60 of the controller 54. In this example, the user interface 60 is specific to operation of the light 18. Separate controls for operation of the fan 16 (e.g., FIG. 7, 9, 17, 19) may be provided via another user interface of the controller 54. In other examples, controls for the fan 16 may be provided via a user interface of a separate controller specific to the fan. Alternatively, the controller 54 may be used to operate either or both of the light 18 and the fan 16 to selectively power each component (e.g., the fan 16 and/or the light 18) on or off, increase/decrease power/intensity, enable automatic (sensor-controlled) output modulation, and/or set/start/stop a timer for changing a power state for one or both of the components. In some examples, the automatic output modulation enables the fan 16 and/or the light 18 to be controlled by one or more sensors (e.g., motion, ambient light, temperature, etc.). In some examples, the one or more sensors may be incorporated and/or integrated with the fan 16, the light 18, and/or the controller 54. Additionally or alternatively, the one or more sensors may be separate from but carried by the fan 16, the light 18, the controller 54, and/or the frame 52. Further, in some examples, one or more of the sensors may be spaced apart from the fan and light unit 48 but in communication with the fan 16, the light 18, and/or the controller 54. In some examples, the controller 54 powers off the fan 16 and/or the light 18 after a certain time period in which motion in the area proximate the unit 48 was not detected by a motion sensor. In other examples, the controller 54 powers on the fan 16 and/or the light 18 when motion in the area proximate the unit 48 is detected by a motion sensor. In some examples, the motion sensor is positioned to monitor the area toward which the fan 16 and the light 18 are pointed. Additionally or alternatively, the motion sensor is positioned to monitor an area other than in the direction that the fan 16 and the light 18 are pointing. Signals from various types of sensors could be used alone or in combination to control the fan 16 and/or the light 18 in different use cases and environmental scenarios.

Figure 5:
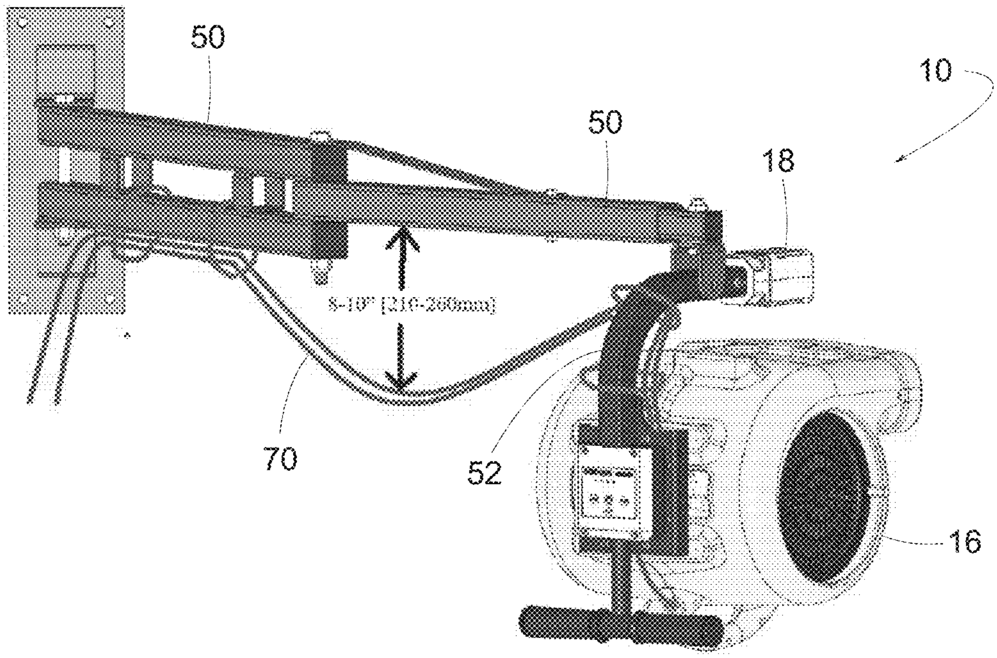
FIG. 5 is another perspective view of the example mounted fan and light apparatus shown in FIG. 1.
Figure 6:
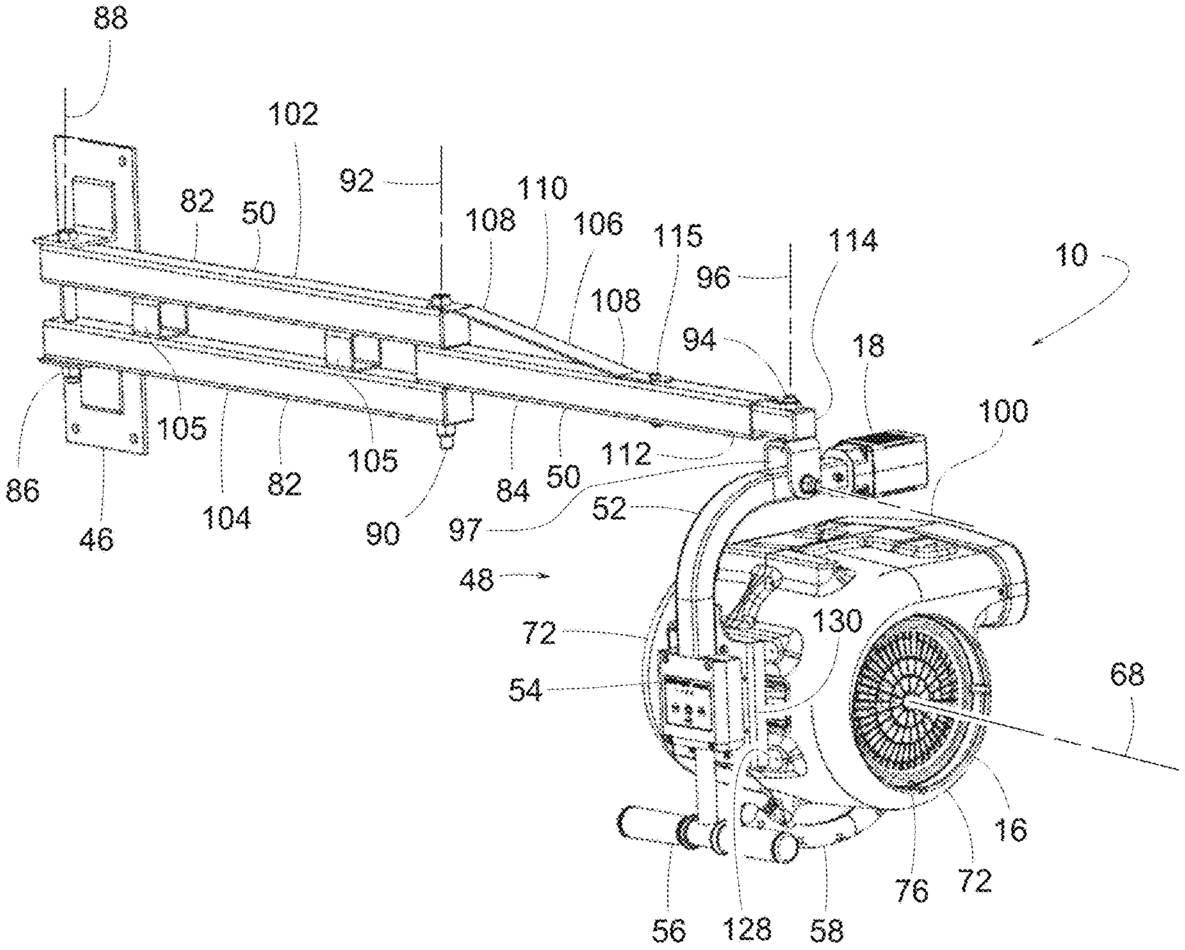
FIG. 6 is another perspective view of the example mounted fan and light apparatus shown in FIG. 1.
Figure 7:
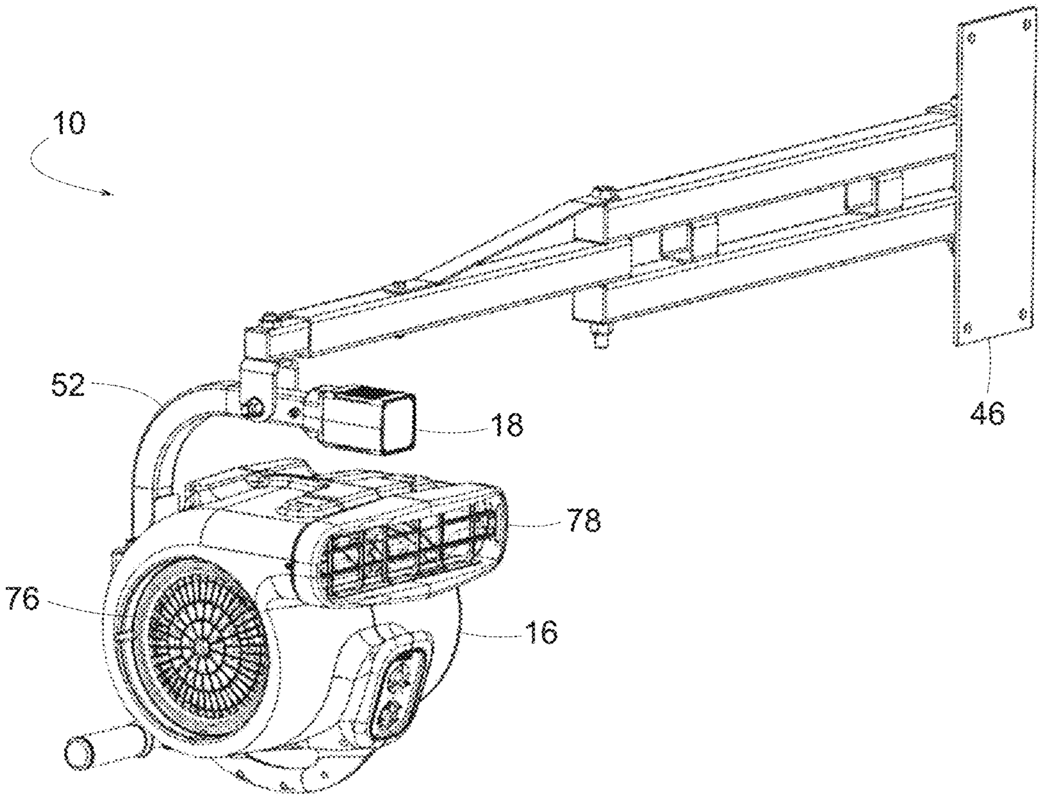
FIG. 7 is another perspective view of the example mounted fan and light apparatus shown in FIG. 6.
Figure 8:
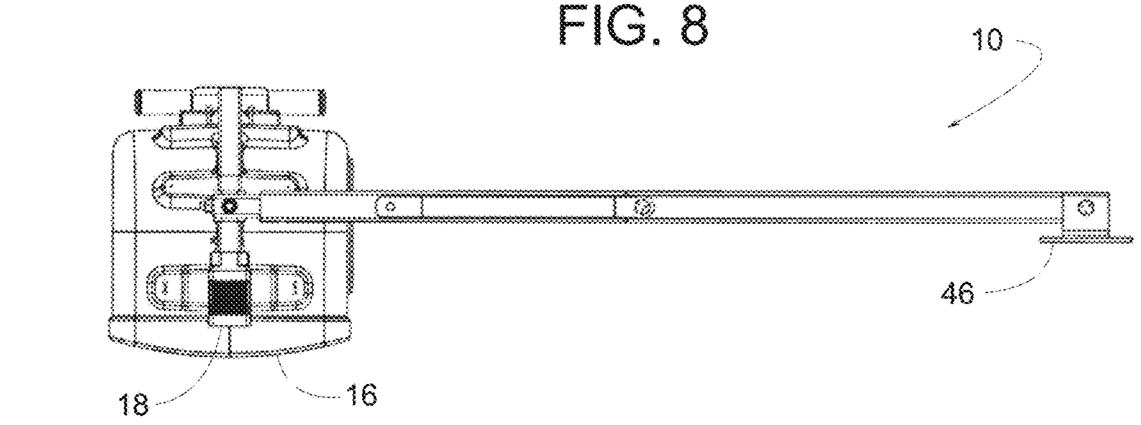
FIG. 8 is a top view of the example mounted fan and light apparatus shown in FIG. 7.
Figure 9:
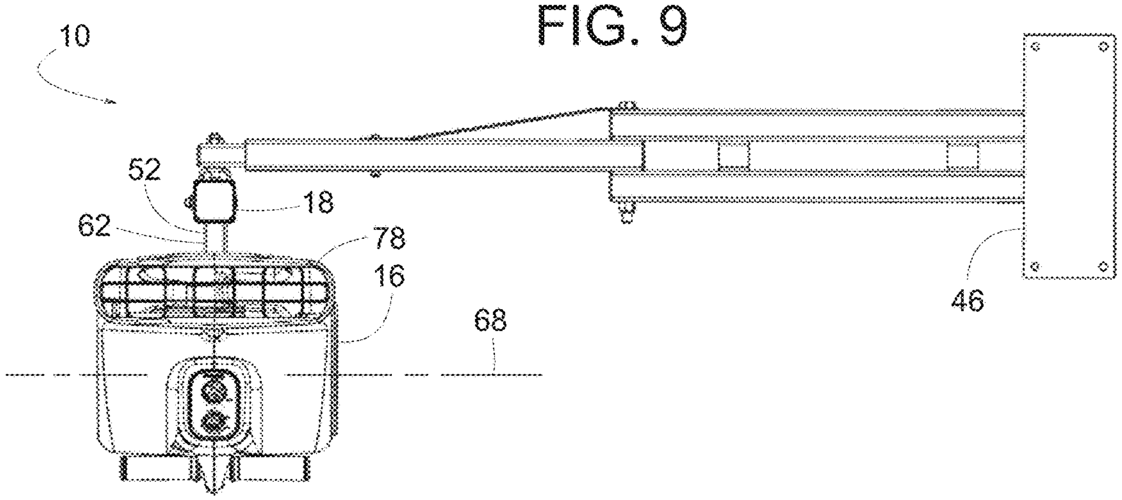
FIG. 9 is a front view of the example mounted fan and light apparatus shown in FIG. 8.
Figure 10:
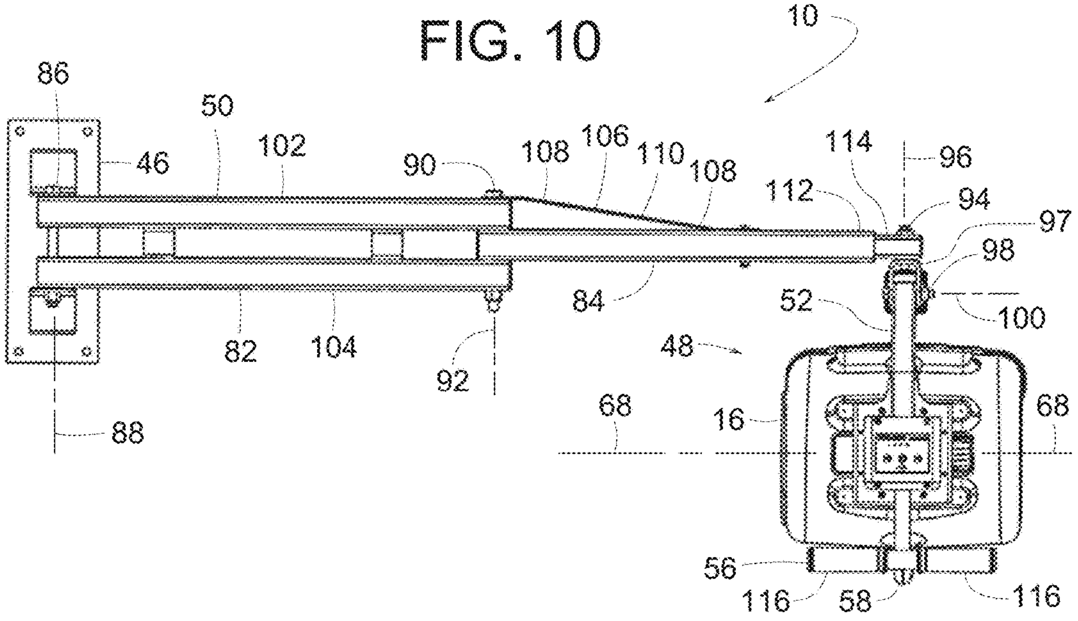
FIG. 10 is a back view of the example mounted fan and light apparatus shown in FIG. 9.

In some examples, the frame 52 comprises a hollow bar or tubular conduit 62 with an internal channel through which an electrical wire 64 (represented by the dashed line in FIG. 11) runs between the controller 54 and the light 18. In some examples, the bar or conduit 62 is rigid to provide structural support for the other components of the fan and light unit 48. In the illustrated example, the conduit 62 has a generally square cross-section. However, other cross-sectional shapes (e.g., circular, rectangular, etc.) may alternatively be used. The electrical wire 64 is just one example of a controlling communication link 66 operatively connecting the controller 54 to the light 18 and/or the fan 16. In some examples, the tubular conduit 62 curves and/or bends about a fan axis 68 and, more generally, about a housing 72 of the fan to reduce (e.g., minimize) structural weight, enhance the unit's appearance, and/or to make it easier to feed the wire 64 through the conduit 62 during assembly. More particularly, in some examples, the frame 52 extends between the controller 54 and the light 18 with a bend such that the controller 54 is positioned proximate a backside of the fan 16 with the light 18 being positioned proximate (but spaced apart from) a top and/or side of the fan 16. In some examples, all three of the fan 16, the light 18, and the controller 54 are aligned within a common plane defined by the curve or bend in the conduit 62. Further, in some examples, the relative position of the fan 16, the light 18 and the controller 54 (due to the shape of the frame 52) generally corresponds to a right triangle with the fan 16 at the right angle of the triangle. In some examples, to enable this arrangement, the tubular conduit 62 curves approximately (e.g., within 5 degrees of) 90 degrees. In other examples, the frame 52 may be formed of straight pieces of conduit 62 connected at joints defining suitable angles (e.g., two pieces connected by a 90 degree joint, three pieces connected in series by two 135 degree joints, etc.). In some examples, additional wiring 70 for the fan 16 and/or the light 18 is strung external of the frame 52 and the articulated arm 50, as shown in FIG. 5. In some such examples, the controller 54 may be spaced apart from the fan and light unit 48.

In the illustrated examples, the fan 16 comprises a fan housing 72 containing a centrifugal impeller 74 (FIG. 1). The fan housing 72 defines a suction air inlet 76 and an air discharge outlet 78. An electric motor inside housing 72 rotates the impeller 74 about a fan axis 68 to force air 80 from the inlet 76, into the housing 72, out through the outlet 78 toward the direction the fan 16 is pointing (e.g., into the vehicle's cargo bay 20). The articulated arm 50 allows the fan 16 and the light 18 to be positioned and repositioned with respect to the structure to which it is mounted.

In some examples, the articulated arm 50 comprises a proximal arm 82 pivotally coupled to a distal arm 84. The proximal arm 82 is coupled to the mounting bracket 46, and the distal arm 84 is coupled to the fan and light unit 48 via the frame 52. The articulation of arm 50 is accomplished by way of several pivotal connections. In some examples such as that shown in FIG. 6, multiple ones of the pivotal axes of these connections are generally parallel (e.g., parallel to within 5 degrees) to one another. For example, a first pivotal connection 86, defining a first axis 88 (generally vertical in the illustrated example), couples the proximal arm 82 to the mounting bracket 46 such that proximal arm 82 is pivotal about the first axis 88 relative to the mounting bracket 46. A second pivotal connection 90, defining a second axis 92 (generally vertical in the illustrated example), couples the distal arm 84 to the proximal arm 82 such that the distal arm 84 is pivotal relative to the proximal arm 82 about the second axis 92. A third pivotal connection 94, defining a third axis 96 (generally vertical in the illustrated example), couples a positioning bracket 97 to the distal arm 84 such that positioning bracket 97 is pivotal relative to the distal arm 84 about the third axis 96. As shown in the illustrated example, the proximal arm 82 and the distal arm 84 include elongate beams that connected at their ends. Therefore, the proximal arm 82 and the distal arm 84 extend in elongate directions that are substantially perpendicular to the first, second, and third axes 88, 92, 96. A fourth pivotal connection 98 defining a fourth axis 100 (generally horizontal in the illustrated example) couples the fan and light unit 48 via the frame 52 to the positioning bracket 97 along the third axis 96 below the third pivotal connection 94. Thus, in the illustrated example, the fourth axis 100 is substantially (e.g., within 5 degrees) perpendicular to the first, second, and third axes 88, 92, 96. As a result, the fan and light unit 48 (including the frame 52) is independently positional pivotally about the third axis 96 and the fourth axis 100, the third and fourth axes 96, 100 intersecting. In some examples, the tightness of the bolts and/or other hardware at the respective pivotal connections 86, 90, 94, 98 controls the freedom with which the components of the articulated arm 50 rotate relative to one another. That is, when the bolts and/or other hardware is relatively loose, the components may easily rotate relative to one another. By contrast, when the bolts are tightened, rotation at the pivotal connections may be significantly reduced and substantially prevented (at least by manual force).

Although the actual construction details of the articulated arm 50 may vary, some examples of the proximal arm 82 comprises an upper beam 102 and a lower beam 104, wherein the distal arm 84 is interposed between the upper and lower beams 102, 104 at the second pivotal connection 90, and both the upper and lower beams 102, 104 are coupled to the mounting bracket 46 via the first pivotal connection 86. In some examples, one or more spacers 105 are positioned at intermediate position(s) along the proximal arm 82 between the upper and lower beams 102 to provide support the proximal arm 82. To provide the distal arm 84 with additional support, some examples of the articulated arm 50 include a diagonal tensile brace 106 having one end 108 connected to the proximal arm 82 and an opposite end 108 connected to the distal arm 84. The illustrated example shows the diagonal tensile brace 106 having a central portion 110 that lies at an incline, i.e., the central portion 110 is displaced out of parallel alignment with both the proximal arm 82 and the distal arm 84.

In some examples, the distal arm 84 comprises a base segment 112 and an extension segment 114. In some examples, the base segment 112 is coupled to the proximal arm 82 via the second pivotal connection 90, the extension segment 114 is coupled to the frame 52 via the third pivotal connection 94 and the fourth pivotal connection 98, and the extension segment 114 is telescopically coupled to the base segment 112. The telescopic connection makes it possible to readily adjust the length of the distal arm 84. In some examples, the particular length at which the extension 114 extends out from the base segment 112 is fixed via a bolt 115 extending through both the base segment 112 and the extension 114 at the distal end 108 of the tensile brace 106. In some examples, the extension 114 includes a series of spaced apart holes distributed along its length through which the bolt 115 may extend to maintain the extension 114 at a fixed telescopic position relative to the base segment 112.

To reduce (e.g., minimize) obstruction by the unit 48 of traffic between the vehicle cargo bay 20, through the doorway 28, and into the building 24 (i.e., the traffic way), and/or to reduce (e.g., minimize) obstruction by traffic (i.e., forklifts, loads, dock workers) of the air stream(s) and light beam(s) produced by the unit 48, the fan and light unit 48 may be positioned near the upper corner of the doorway 28. With the articulated arm 50 (including positioning bracket 97) providing various degrees of adjustable freedom and length, a dockworker may use the first handle 56 to easily position the fan and light unit 48 relative to the building structure 12, the doorway 28, the vehicle 22, and/or traffic way associated with the dock between various use positions and various stored positions. In some examples, the first handle 56 may also be used to aim the fan 16, and associated air stream(s), and the light 18, and associated light beam(s), relative to the building structure 12, the doorway 28, the vehicle 22, and/or traffic way associated with the dock. To increase (e.g., maximize) the elevation of the fan 16 and the light 18 with respect to the dock floor 34 while keeping the unit 48 within a dockworker's reach, the first handle 56 may be positioned or located at or near the lower edge of the unit 48 (i.e., lower than the fan axis 68 (e.g., a midpoint of the fan 16), the controller 54, and/or the light 18). In some examples, the elevation of the controller 54 is positioned below that of the light 18 to increase (e.g., maximize) the elevation of the light 18 in order to reduce (e.g., minimize) obstruction of the light shining into the cargo bay 20 while keeping the controller 54 within reach of the dockworker. The first handle 56 may be of a shape that enables ergonomic positioning of the unit 48. In the illustrated example, the first handle 56 is in the form of a handlebar with two handgrips 116 (generally perpendicular to the third axis 96 and generally parallel to the fourth axis 100) to make it easier for the dockworker to position and aim the fan 16 and the light 18. In some examples, the first handle 56 is an integral feature of the frame 52. Some examples of the fan and light unit 48 include the second handle 58 with a handgrip generally perpendicular to those of the first handle 56, which provides a dockworker with more options for gripping to position and aim the fan and light unit 48. In some examples, the second handle 58 is an integral feature of the fan housing 72. In operation, a dockworker can grasp some combination of the handgrips 116 and the second handle 58 simultaneously (e.g., one hand on the first handle 56 and the other hand on second handle 58) to position the fan and apply a rotational moment about the axis 96 to aim the fan 16 and the light 18 horizontally (e.g., when the third axis 96 is oriented vertically) and about the axis 100 to aim the fan 16 and the light 18 vertically (e.g., when the fourth axis 100 is oriented horizontally).

Referring to FIGS. 12-15, some examples of the apparatus 10 have an adjustable mounting bracket 46' comprising a track 118 and a track follower 120 that render the articulated arm 50 and the fan and light unit 48 movable along the track 118 relative to the structure 12 to which the bracket 46' is mounted. In some examples, the track extends in a direction that is substantially parallel (e.g., within 5 degrees) to the first axis 88 and, therefore, substantially perpendicular (e.g., within 5 degrees) to the direction in which the proximal arm 82 extends from the bracket 46'. As a result, when the adjustable mounting bracket 46' is mounted to the structure 12 with the track 118 extending vertically, the articulated arm 50 extends horizontally with the fan and light unit 48 being enabled to be selectively raised (vertically) for additional clearance underneath the unit 48 or lowered to an elevation more suitable for positioning and/or ventilating and/or illuminating the vehicle's cargo bay 20 and then being maintained in that vertical position until being subsequently and selectively raised or lowered. In some examples, the wall mounting bracket 46' is adjustable by way of an actuator 122 such as, for example, a crank-up screw jack 124 manually powered by a crank 126, a motorized linear actuator, a powered cylinder, a spring and/or various combinations thereof, etc.

Figure 17:
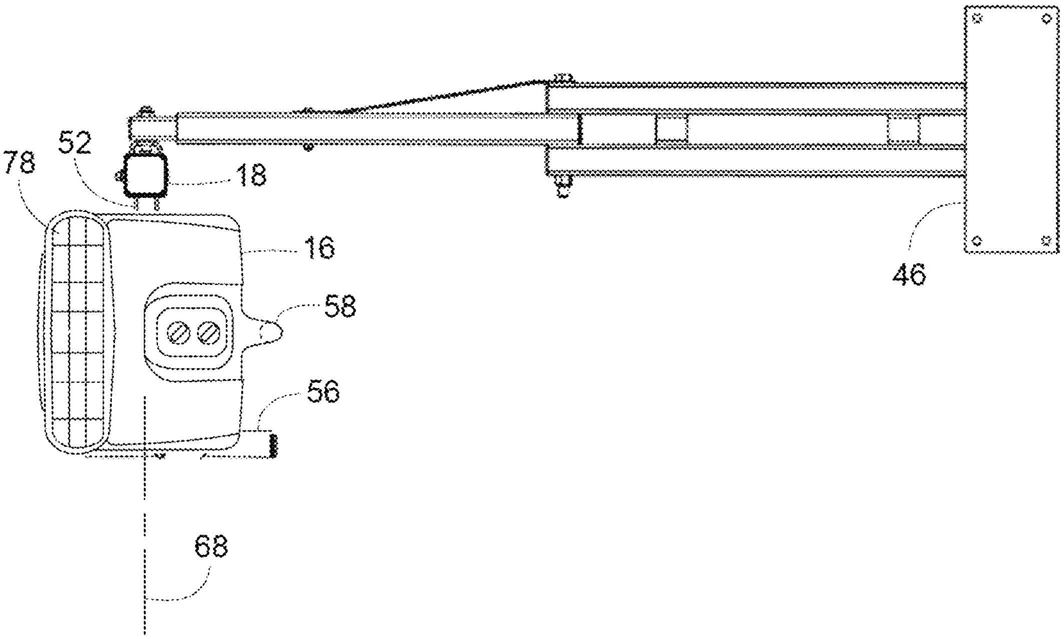
FIG. 17 is a perspective view of the example mounted fan and light apparatus shown in FIG. 9 but with the fan housing turned ninety degrees.
Figure 18:
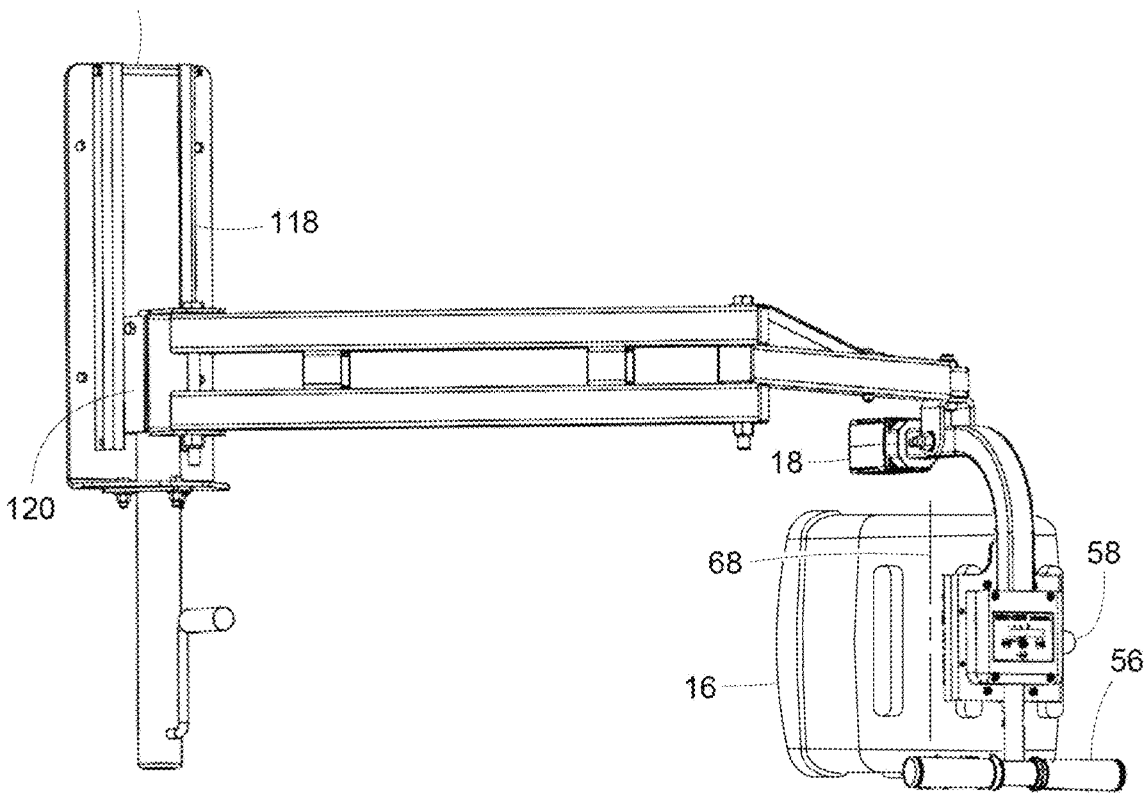
FIG. 18 is a perspective view of the example mounted fan and light apparatus shown in FIG. 12 but with the fan housing turned ninety degrees.

Some examples of the apparatus 10 include a fan and light unit 48 with a different orientation of the fan 16 with respect to the light 18 and/or the frame 52. For example, the fan 16 can be set at a horizontal orientation with the fan axis 68 being substantially horizontal with the discharge outlet 78 positioned so as to be at the top of fan 16, as shown in FIGS. 6-10, or a vertical orientation with the fan axis 68 being substantially vertical with the discharge outlet 78 positioned so as to be to the side of fan 16, as shown in FIGS. 17-20. To achieve this, some examples of the apparatus 10 have a frame plate 130 (FIG. 11) on the frame 52 and a mating mounting surface 128 on the fan housing 72. In some examples, the controller 54 is positioned adjacent and/or attached to the frame plate 130 on an opposite side to the fan 16. Bolt hole patterns 131 in the frame plate 130 and corresponding holes in the mounting surface 128 are symmetrical such that the frame plate 130 can be attached to the mounting surface 128 selectively in a first orientation (e.g., FIGS. 6-10) and a second orientation (FIGS. 17-20). In some examples, the pattern of holes 131 is positioned so as to surround the controller 54 that is also attached to the frame plate 130. As most easily seen in FIG. 17, the alternate mounting arrangements for the unit 48 enables the unit 48 to be positioned relative to the building structure 12, the doorway 28, the vehicle 22, and/or traffic way associated with the dock such that a reduced (e.g., minimal) portion of the apparatus 10 (particularly, the outlet 78 of the fan 16) extends into or near the traffic way while still ventilating and illuminating the cargo bay 20. That is, as shown in the illustrated examples, the outlet 78 of the fan 16 extends across substantially the full width of the fan 16 when oriented upright (e.g., as shown most clearly in FIG. 9) such that the entire fan housing 72 would need to be within the doorway 28 and/or traffic way to enable the entire outlet 78 to be exposed to the cargo bay 20 of the vehicle 22. By contrast, when the fan 16 is oriented on its side with the outlet 78 oriented vertically to one side (e.g., as shown in FIG. 17) a considerable portion of the fan housing 72 may be positioned outside of the doorway 28 and/or the traffic way if the light 18 is positioned directly adjacent the edge of the doorway 28 (e.g., just inside the door jamb) while still enabling the entire outlet 78 to be exposed to the cargo bay 20 of the vehicle 22.

Figure 19:
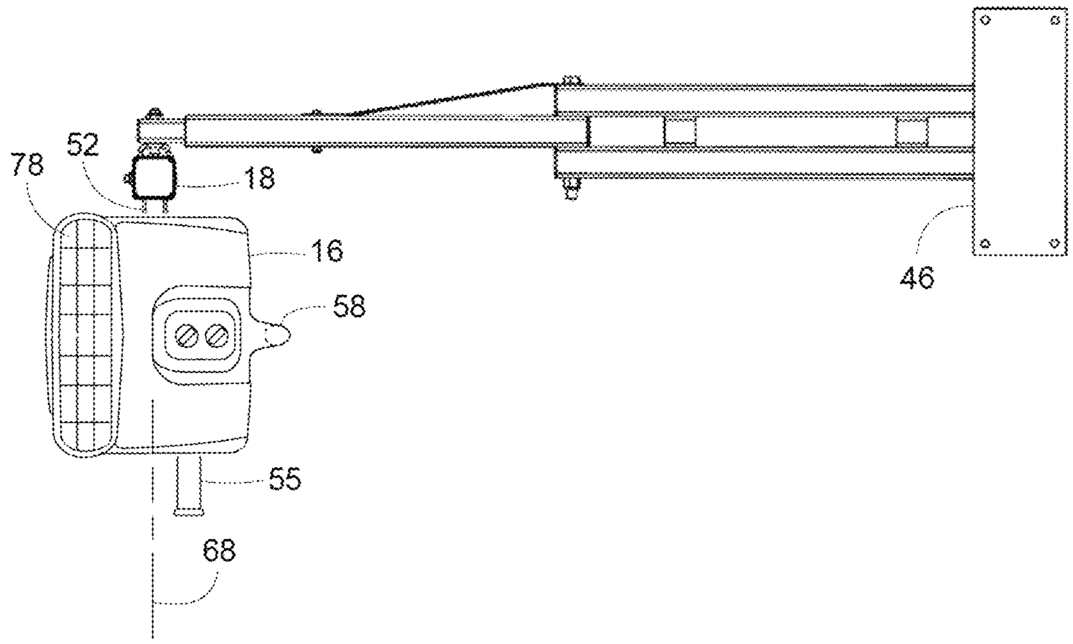
FIG. 19 is a perspective view of another example mounted fan and light apparatus constructed in accordance with teachings disclosed herein.
Figure 20:
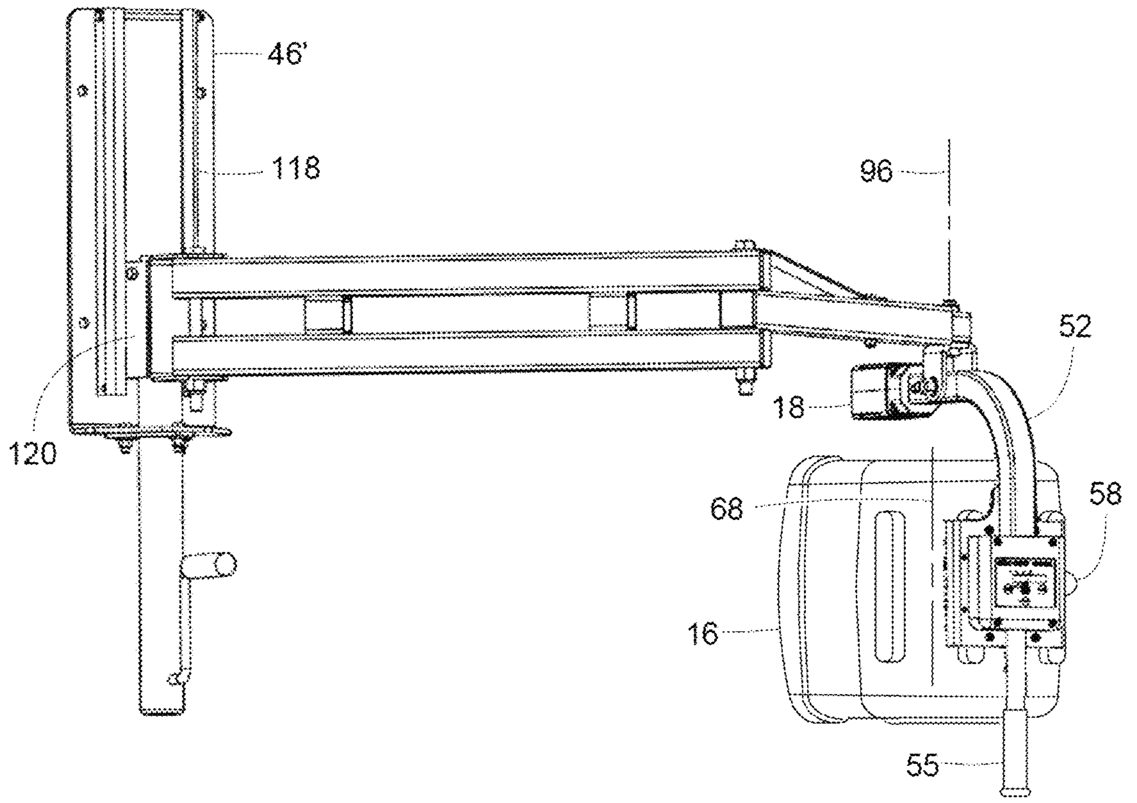
FIG. 20 is a perspective view of another mounted fan and light apparatus constructed in accordance with teachings disclosed herein.

In the examples shown in FIGS. 19 and 20, a vertical single handgrip handle 55 extends down from the frame 52 (perpendicular to the second handle 58 of the 90 degree rotated fan) replacing the horizontal handlebar-style handle 56. In operation, a dockworker can grasp the handles 55, 58 simultaneously (e.g., one hand on the single handgrip handle 55 and the other hand on the second handle 58) to position the fan 16 and apply a rotational moment about the axis 96 to aim the fan 16 and the light 18 horizontally (e.g., when the third axis 96 is oriented vertically) and about the axis 100 to aim the fan 16 and the light 18 vertically (e.g., when the fourth axis 100 is oriented horizontally).

In addition to being able to mount the fan 16 horizontally or vertically, it should be noted that in some examples, such as the examples shown in FIGS. 19 and 20, the fan 16 can be flipped over 180 degrees about a horizontal axis. FIG. 20, for instance, shows the fan 16 being mounted 180-degrees from its orientation shown in FIG. 19. Being able to mount the fan 16 in either position can be advantageous depending on whether the mounting bracket 46 or 46' is mounted on the right or left side of the doorway 28.

Figure 21:
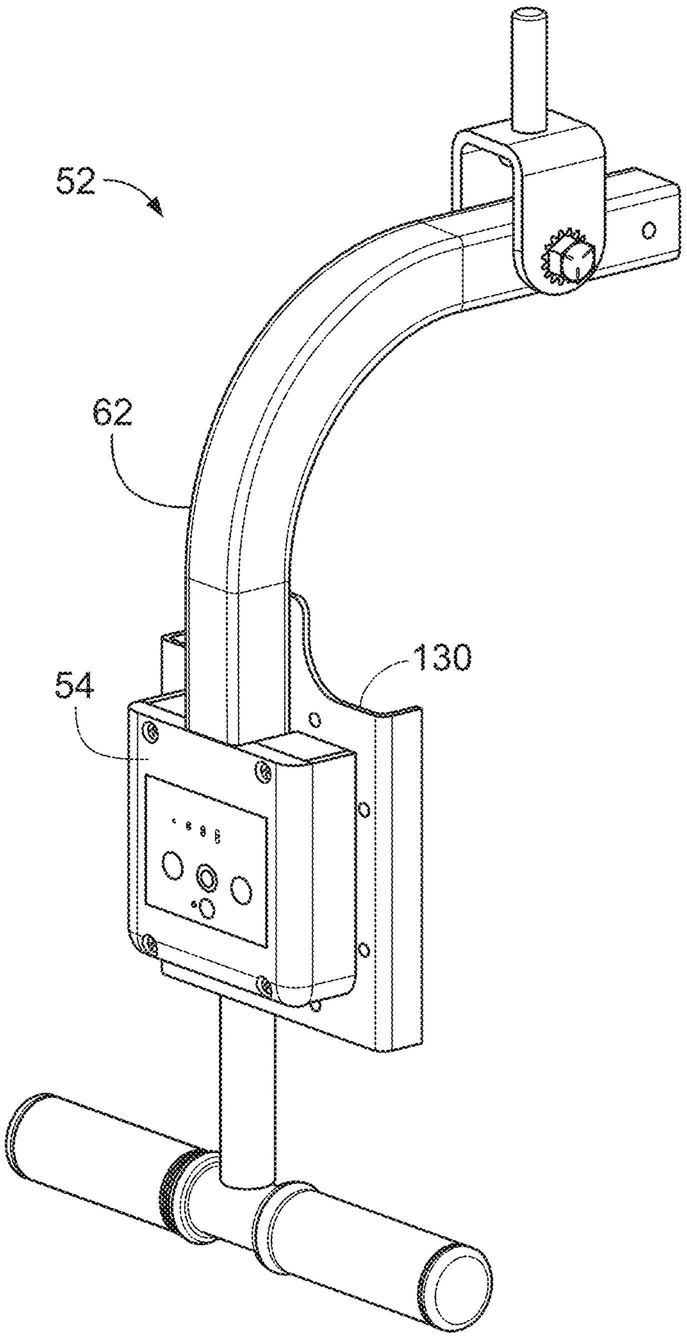
FIG. 21 is a perspective view of an example frame of the example fan and light unit with the controller attached.
Figure 22:
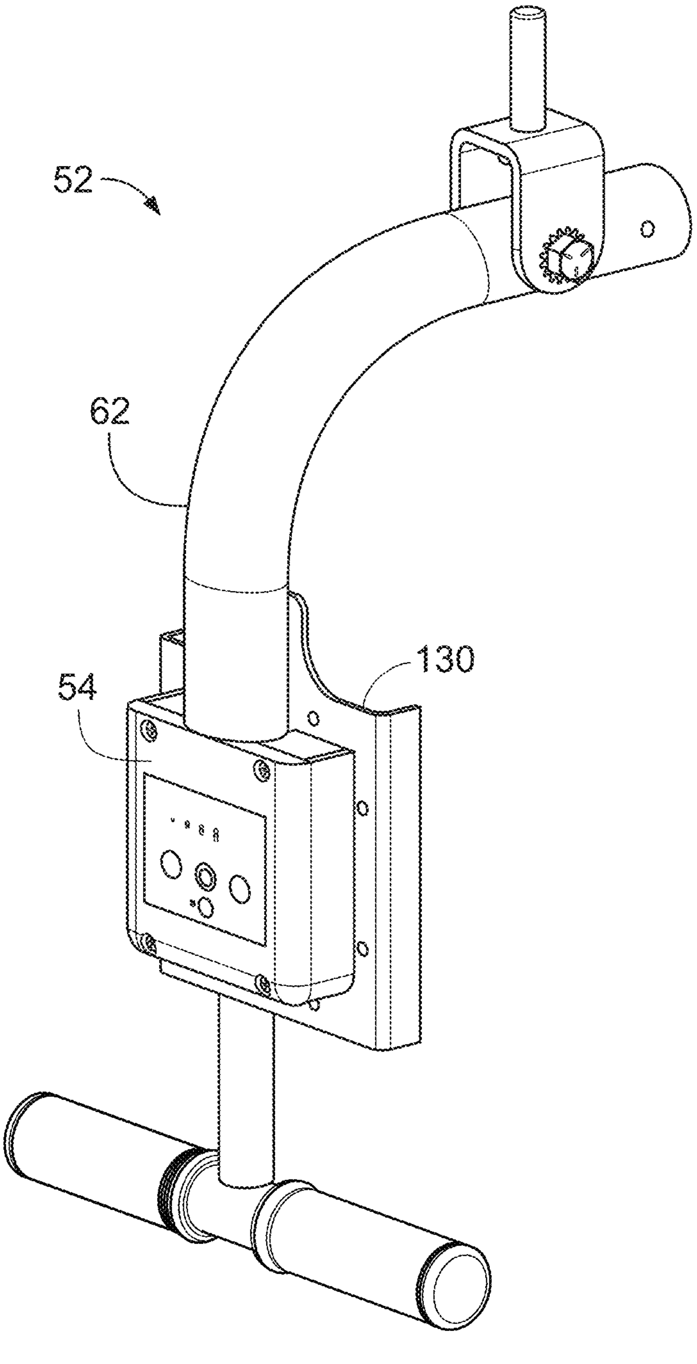
FIG. 22 is a perspective view of another example frame of the example fan and light unit with the controller attached.
Figure 23:
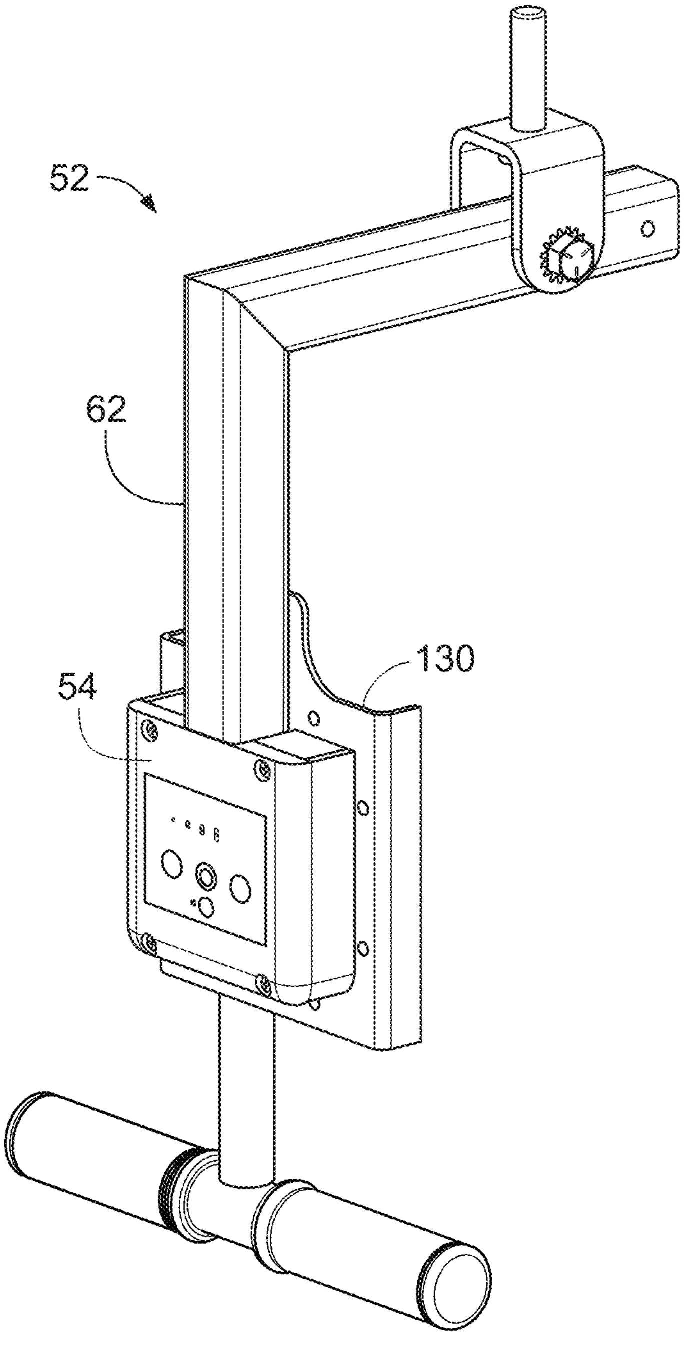
FIG. 23 is a perspective view of another example frame of the example fan and light unit with the controller attached.
Figure 24:
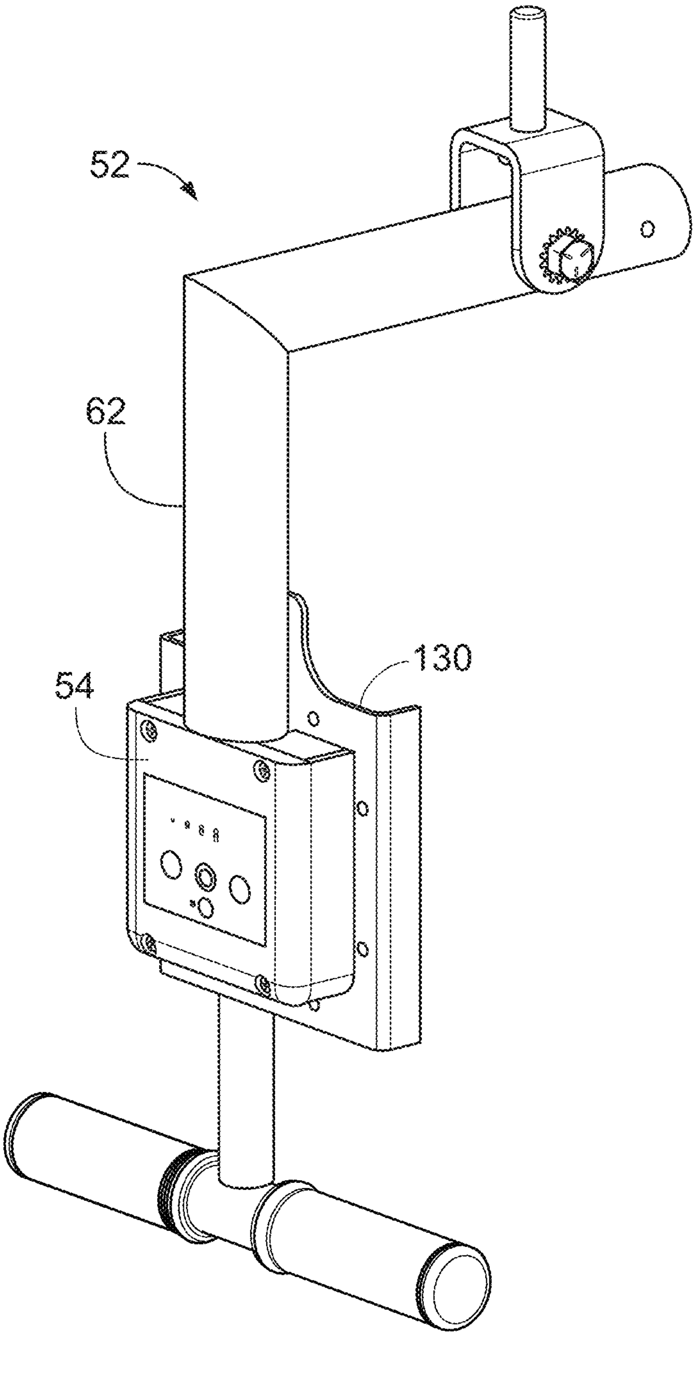
FIG. 24 is a perspective view of another example frame of the example fan and light unit with the controller attached.
Figure 25:
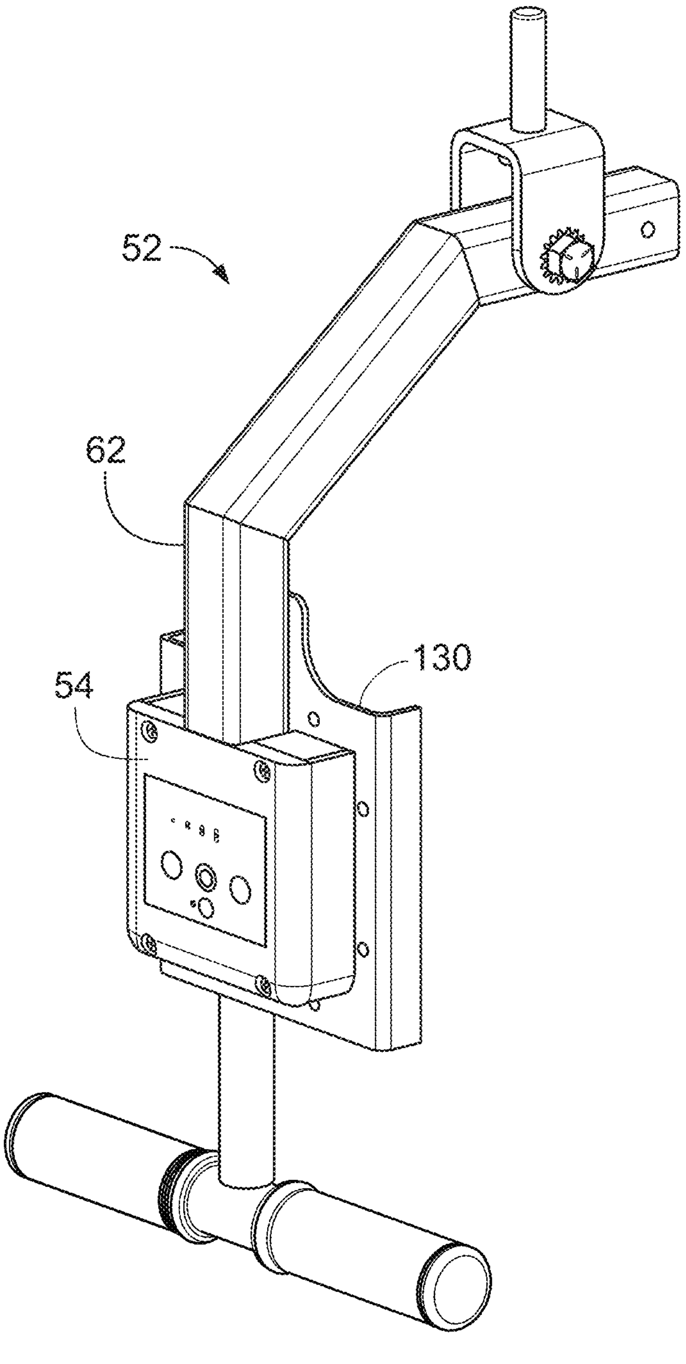
FIG. 25 is a perspective view of another example frame of the example fan and light unit with the controller attached.
Figure 26:
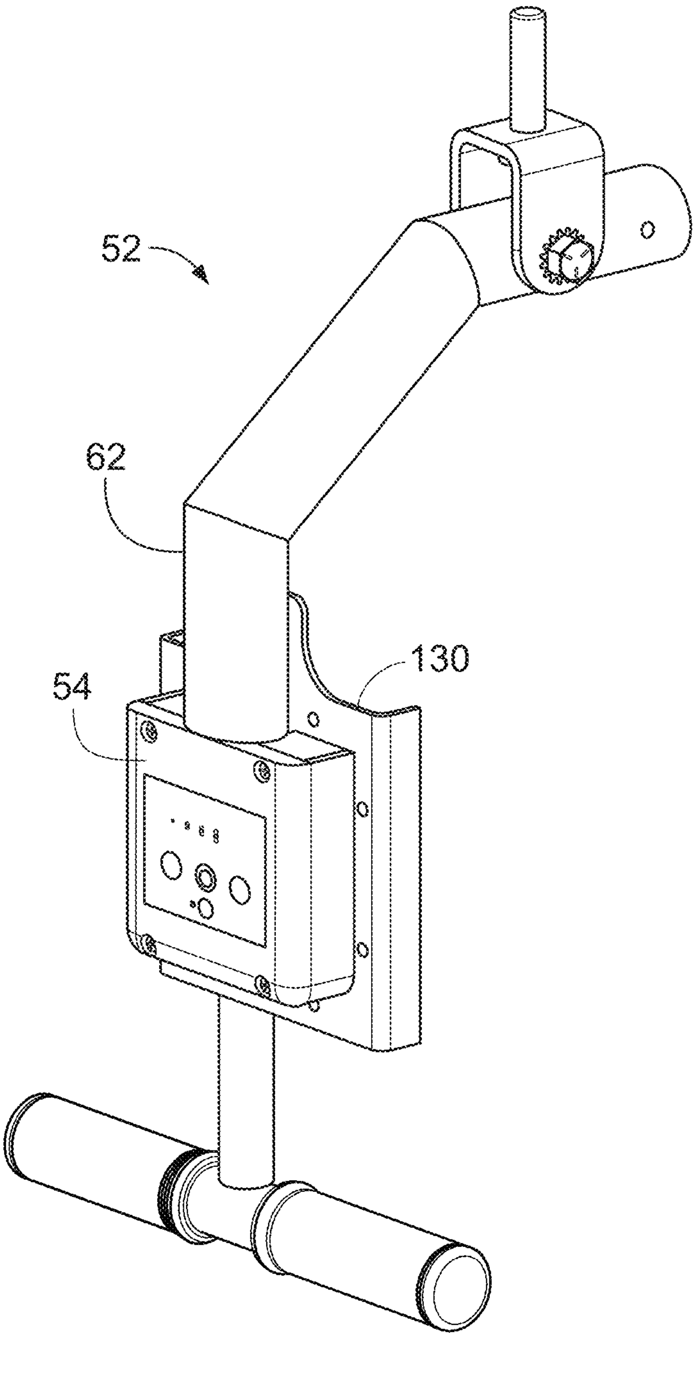
FIG. 26 is a perspective view of another example frame of the example fan and light unit with the controller attached.

As mentioned above, the hollow bar or tubular conduit 62 of the frame 52 may have different cross-sectional shapes and/or have different types of bends along its length between the controller 54 and the light 18. Several different examples are shown in FIGS. 21-26. In particular, FIG. 21 illustrates the frame 52 with the example conduit 62 having a square cross-section and a curved bend. FIG. 22 illustrates the frame 52 with the example conduit 62 having a round cross-section and a curved bend. FIG. 23 illustrates the frame 52 with the example conduit 62 having a square cross-section and an approximately 90 degree bend. FIG. 24 illustrates the frame 52 with the example conduit 62 having a round cross-section and an approximately 90 degree bend. FIG. 25 illustrates the frame 52 with the example conduit 62 having a square cross-section and two approximately 135 degree bends. FIG. 26 illustrates the frame 52 with the example conduit 62 having a round cross-section and two approximately 135 degree bends.

Example 1 includes an apparatus comprising a light, a fan, and a frame to support the light and the fan in fixed relationship to one another, the frame to pivotally couple to an articulated arm, the articulated arm to be coupled to a building structure adjacent a vehicle loading dock to enable selective positioning of the light and the fan relative to a doorway at the loading dock Example 2 includes the apparatus of example 1, wherein the frame is to hold the light spaced apart from the fan.

Example 3 includes the apparatus of example 2, wherein the light is to be above the fan when the frame is mounted to the building structure via the articulated arm.

Example 4 includes the apparatus of example 1, wherein the light and the fan are to point in substantially a same direction.

Example 5 includes the apparatus of example 1, further including a controller to control operation of at least one of the light or the fan.

Example 6 includes the apparatus of example 5, wherein the frame includes a rigid conduit extending between the light and the controller, the light to be electrically coupled to the controller via an electrical wire extending through the conduit.

Example 7 includes the apparatus of example 5, wherein the frame supports the controller adjacent a back of the fan, the frame including a bend between the controller and the light, the bend to extend around the fan to position the light proximate one of a top or a side of the fan.

Example 8 includes the apparatus of example 1, wherein the fan is selectively mountable to the frame in a first orientation and a second orientation, the first orientation being rotated approximately 90 degrees relative to the second orientation, the first and second orientations corresponding to different placements of a discharge outlet of the fan relative to the frame.

Example 9 includes the apparatus of example 8, wherein the fan is selectively mountable to the frame in a third orientation, the third orientation being rotated approximately 90 degrees relative to the first orientation, the third orientation being rotated approximately 180 degrees relative to the second orientation.

Example 10 includes the apparatus of example 8, further include a frame plate attached to the frame, the frame plate including a symmetrical pattern of holes that align with a mounting surface of a housing of the fan in both the first orientation and the second orientation.

Example 11 includes the apparatus of example 1, further including a handle to facilitate positioning of the light and the fan, the handle to be positioned below the light and below an axis of rotation of the fan.

Example 12 includes the apparatus of example 11, wherein the handle includes a handlebar with two handgrips to extend substantially horizontally.

Example 13 includes the apparatus of example 11, wherein the handle includes a single handgrip extending substantially vertically.

Example 14 includes the apparatus of example 1, further including a mounting bracket to connect the articulated arm to the building structure via a pivotal connection, the pivotal connection defining an axis of rotation that is substantially perpendicular to an elongate length of the articulated arm.

Example 15 includes the apparatus of example 14, wherein the mounting bracket includes a track and a track follower selectively moveable along the track, the articulated arm connected to the track follower, the track extending substantially parallel to the axis of rotation.

Example 16 includes the apparatus of example 15, further including an actuator operatively coupled to at least one of the track or the track follower to enable selective movement of the track follower relative to the track.

Example 17 includes the apparatus of example 1, further including the articulated arm, the articulated arm including a proximal arm to be pivotally coupled to the building structure, and a distal arm to be pivotally coupled to the proximal arm, the frame to pivot about both a first axis and a second axis relative to the distal arm, the first axis and the second axis being substantially perpendicular.

Example 18 includes an apparatus comprising an illuminating fan assembly including a fan, a light, and a frame, the frame to support the fan and the light, and a positioning bracket to be connected to the frame at a first pivotal connection defining a first axis, the positioning bracket to be connect to an articulated arm at a second pivotal connection defining a second axis, the articulated arm to be mounted to a building structure adjacent a vehicle loading dock, the illuminating fan assembly to pivot, as a unit, about both the first axis and the second axis relative to the articulated arm, the first axis and the second axis being substantially perpendicular.

Example 19 includes the apparatus of example 18, wherein the light is to be separated from the fan by the frame.

Example 20 includes the apparatus of example 18, wherein the light and the fan are to point in substantially a same direction.

Example 21 includes the apparatus of example 18, wherein the light is to be above the fan when the illuminating fan assembly is mounted to the building structure via the articulated arm.

Example 22 includes the apparatus of example 18, further including a frame plate attached to the frame, the fan to be mounted to the frame via the frame plate.

Example 23 includes the apparatus of example 22, wherein the frame plate enables the fan to be selectively mounted to the frame in either a first orientation or a second orientation, the first orientation being rotated approximately 90 degrees relative to the second orientation, the first and second orientations corresponding to different placements of a discharge outlet of the fan relative to the frame.

Example 24 includes the apparatus of example 23, wherein the frame plate enables the fan to be selectively mounted to the frame in a third orientation, the third orientation being rotated approximately 90 degrees relative to the first orientation and approximately 180 degrees relative to the second orientation.

Example 25 includes the apparatus of example 22, wherein the fan is mounted to the frame plate via a mounting surface on a backside of a housing of the fan, the backside opposite a discharge outlet of the fan.

Example 26 includes the apparatus of example 25, further including a controller to control operation of at least one of the light or the fan, the frame plate positioned between the controller and the fan.

Example 27 includes the apparatus of example 26, wherein the frame includes a hollow bar extending between the light and the controller, the light to be electrically coupled to the controller via an electrical wire extending through the bar.

Example 28 includes the apparatus of example 27, wherein the hollow bar includes a bend to extend around the fan to position the light above the fan with the controller behind the fan when the illuminating fan assembly is supported by the articulated arm.

Example 29 includes the apparatus of example 18, further including a handle on the frame, the handle to be positioned lower than the light and lower than a midpoint of the fan.

Example 30 includes the apparatus of example 29, wherein the handle includes a handlebar with two handgrips to extend substantially horizontally.

Example 31 includes the apparatus of example 29, wherein the handle includes a single handgrip extending substantially vertically.

Example 32 includes the apparatus of example 29, wherein the handle is an integral portion of the frame.

Example 33 includes the apparatus of example 29, wherein the handle is a first handle, and further including a second handle spaced apart from the first handle, the second handle being an integral portion of the fan housing.

Example 34 includes the apparatus of example 18, further including the articulated arm, and a mounting bracket to mount the articulated arm to the building structure, the mounting bracket including a track, the articulated arm moveable along the track to selectively adjust a position of the articulated arm relative to the mounting bracket.

Example 35 includes the apparatus of example 34, further including an actuator operatively coupled to the mounting bracket to enable selective movement of the articulated arm along the track.

Example 36 includes an apparatus for use at a vehicle loading dock, the apparatus comprising a frame to be pivotally coupled to an arm mountable to a building structure adjacent the vehicle loading dock, a fan to be coupled to the frame, a controller to be coupled to the frame, the controller to control operation of the fan, and a handle connected to the frame, the handle to be lower than the controller and lower than at least a midpoint of the fan when supported by the arm.

Example 37 includes the apparatus of example 36, further including the arm, a mounting bracket having a track, the arm to be mounted to the building structure via the mounting bracket, and a track follower selectively moveable along the track, the arm to be pivotally coupled to the track follow such that as the track follower moves relative to the mounting bracket the arm moves with the track follower relative to the mounting bracket.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:

a frame including an elongate bar, the bar to be pivotally coupled to a support system via a point of attachment on the bar between first and second ends of a longitudinal length of the bar; and a fan including an air outlet pointing in a first direction, the air outlet offset relative to a center of the fan, the fan selectively mountable to the frame in different orientations to change a location of the air outlet relative to the frame, the different orientations including a first orientation and a second orientation, the first orientation rotated relative to the second orientation about an axis, the axis extending through the center of the fan, the axis generally parallel to the first direction.

2. The apparatus of claim 1, further including a frame plate attached to the frame, the frame plate including first holes that align with second holes in a mounting surface of a housing of the fan in both the first orientation and the second orientation.

3. The apparatus of claim 2, wherein the first and second holes in the frame plate are arranged in a symmetrical pattern.

4. The apparatus of claim 2, wherein the air outlet is located at a front of the fan, the mounting surface of the housing of the fan at a back of the fan opposite the front of the fan.

5. The apparatus of claim 2, further including a light, the bar to support the light such that the light remains in a same position relative to the frame regardless of whether the fan is in the first orientation or the second orientation.

6. The apparatus of claim 5, further including a controller to control operation of the light, the controller to be attached to the frame plate.

7. The apparatus of claim 6, wherein the frame plate is between the controller and the housing of the fan.

8. The apparatus of claim 1, wherein the air outlet is defined by a first dimension and a second dimension perpendicular to the first dimension, the second dimension greater than the first dimension, the air outlet offset relative to the center of the fan in a third direction parallel to the first dimension.

9. The apparatus of claim 8, wherein the second dimension corresponds to a width of the fan.

10. The apparatus of claim 8, wherein the second dimension is to extend in a fourth direction when the fan is in the first orientation and to extend in a fifth direction when the fan is in the second orientation, the fourth direction closer to a horizontal direction than to a vertical direction, the fifth direction closer to the vertical direction than to the horizontal direction.

11. The apparatus of claim 1, wherein the first orientation is rotated approximately 90 degrees relative to the second orientation.

12. The apparatus of claim 11, wherein the different orientations include a third orientation, the third orientation rotated approximately 90 degrees relative to the first orientation and rotated approximately 180 degrees relative to the second orientation.

13. The apparatus of claim 1, further including a handle connected to the frame, the handle to be lower than at least a midpoint of the fan when the fan is supported by the support system via the bar of the frame.

14. The apparatus of claim 13, wherein the handle is to remain at a fixed position relative to the frame regardless of whether the fan is in the first orientation or the second orientation.

15. The apparatus of claim 1, wherein the fan is to be positioned with the air outlet at a top of the fan when the fan is in the first orientation and at a lateral side of the fan when the fan is in the second orientation.

16. The apparatus of claim 1, wherein the center of the fan is defined by an axis of rotation of the fan.

17. An apparatus comprising:

a bar pivotally couplable to an arm at a point of attachment on the bar between opposites ends of a longitudinal length of the bar; and a fan to be supported by the arm via the bar, the fan including a discharge outlet at a front of the fan, the discharge outlet defining a first area that is less than a second area corresponding to an outer perimeter of a projection of an entire body of the fan from the front of the fan, the discharge outlet spaced apart from a midpoint of the entire body of the fan, the fan selectively couplable to the bar in a first orientation or a second orientation, the first orientation rotated relative to the second orientation, the bar to extend above the fan when the fan is coupled to the bar in the first orientation, the bar to extend above the fan when the fan is coupled to the bar in the second orientation.

18. The apparatus of claim 17, further including a frame plate to attach the fan to the bar, the frame plate to attach to a backside of the fan opposite the front of the fan.

19. An apparatus comprising:

a fan;

a frame including a bar, the frame to be supported by an arm pivotally couplable to the bar at a point of attachment between first and second ends of an elongate portion of the bar; and a handle to facilitate positioning of the fan, the handle to be vertically and horizontally offset relative to the point of attachment when the frame is supported by the arm, the elongate portion of the bar is to extend in a first direction, the handle to extend in a second direction different than the first direction, the fan to be attached to the bar in a fixed spatial relationship and fixed rotational relationship so that the positioning of the fan by the handle results in a corresponding movement of the bar, the positioning of the fan by the handle including movement of the fan relative to the arm and movement of the fan relative to a surrounding environment.

20. The apparatus of claim 19, further including a light, the bar to hold the light spaced apart from the fan, the light to be coupled to the bar at the first end, the fan to be coupled to the bar at the second end.

* * * * *